(12) United States Patent (10) Patent No.: US 7,542,485 B2
Bingham et al. (45) Date of Patent: Jun. 2, 2009

(54) TIME AND DATA SYNCHRONIZATION BETWEEN NETWORK DEVICES

(75) Inventors: David Thomas Bingham, Nepean (CA); James Andrew Stelzig, Gatineau (CA); Behrouz Poustchi, Ottawa (CA); Cristian Hudici, Nepean (CA)

(73) Assignee: Avaya, Inc., Lincroft, NJ (US)

( * ) Notice: Subject to any disclaimer, the term of this patent is extended or adjusted under 35 U.S.C. 154(b) by 1002 days.

(21) Appl. No.: 10/991,995

(22) Filed: Nov. 19, 2004

(65) Prior Publication Data

US 2005/0135429 A1 Jun. 23, 2005

Related U.S. Application Data

(60) Provisional application No. 60/523,140, filed on Nov. 19, 2003.

(51) Int. Cl.
*H04J 3/06* (2006.01)
*H04L 7/00* (2006.01)
(52) U.S. Cl. .................. 370/507; 370/241; 709/248; 375/357; 375/358; 340/825.2
(58) Field of Classification Search ................ 370/241, 370/324, 350, 503, 507, 509; 709/248; 375/240.28, 375/356, 357, 358; 340/825.2
See application file for complete search history.

(56) References Cited

U.S. PATENT DOCUMENTS 5,734,818 A * 3/1998 Kern et al. ................... 714/20
5,806,074 A 9/1998 Souder et al.
6,052,363 A * 4/2000 Koch ........................ 370/252
6,125,368 A 9/2000 Bridge et al.
6,269,095 B1 7/2001 Neubaurer et al.
6,449,622 B1 9/2002 LaRue et al.

(Continued)

FOREIGN PATENT DOCUMENTS

WO WO 00/62470 10/2000

(Continued)

OTHER PUBLICATIONS

Leslie Lamport, Massachusetts Computer Associates, Inc., "Time, Clocks, and the Ordering of Events in a Distributed System," Communications of the ACM, Jul. 1978, vol. 21, No. 7, pp. 558-565.

*Primary Examiner*—Chi H Pham
*Assistant Examiner*—Ahmed Elallam
(74) *Attorney, Agent, or Firm*—Muncy, Geissler, Olds & Lowe, PLLC

(57) ABSTRACT

To synchronize time between network devices equally capable of accurately maintaining an indication of current time, one of the network devices is deemed to be a reference for time and the other network devices synchronize their indications of current time to the reference. To synchronize copies of data at multiple network devices, each network device maintains a counter representative of the passage of time but not necessarily of current time. The counter at each device is periodically synchronized with the counters of other network devices. When data is changed at a network device, the value of the counter at the time of changing is stored in association with the changed data. Stored counter values are used to determine whether a local copy or a remote copy of the data is likely more recent and therefore preferable. A further test may be applied if a counter value comparison is inconclusive.

63 Claims, 15 Drawing Sheets

U.S. PATENT DOCUMENTS

| | | |
|---|---|---|
| 6,522,629 B1 | 2/2003 | Anderson, Sr. |
| 6,535,505 B1 | 3/2003 | Hwang et al. |
| 6,587,461 B1 | 7/2003 | Parrish et al. |
| 6,661,811 B1 * | 12/2003 | Baker .................. 370/516 |
| 6,751,573 B1 * | 6/2004 | Burch .................. 702/178 |
| 6,766,407 B1 | 7/2004 | Lisitsa et al. |
| 2002/0027886 A1 | 3/2002 | Fischer et al. |
| 2002/0057717 A1 | 5/2002 | Mallory |
| 2004/0008661 A1 | 1/2004 | Myles et al. |
| 2005/0117525 A1 * | 6/2005 | Poustchi et al. ............. 370/254 |

FOREIGN PATENT DOCUMENTS

| | | |
|---|---|---|
| WO | WO 01/19005 A1 | 3/2001 |
| WO | WO 01/99317 A1 | 12/2001 |

* cited by examiner

TIME AND DATA SYNCHRONIZATION BETWEEN NETWORK DEVICES

CROSS REFERENCE TO RELATED APPLICATIONS

The present application claims the benefit of prior provisional application Ser. No. 60/523,140 filed Nov. 19, 2003, the contents of which are hereby incorporated by reference hereinto.

FIELD OF THE INVENTION

The invention relates to synchronization of time and data between network devices in communication networks, such as peer-to-peer networks for example.

BACKGROUND OF THE INVENTION

In many known circuit-switched or packet-switched telephony solutions, a centralized piece of equipment (e.g. a switch or Private Branch Exchange (PBX)) provides call termination, call processing, switching and/or call handling capabilities. In large systems, the central equipment may be a powerful computer controlling a number of functions on circuit boards called line cards, which connect telephone sets to the computer. In small systems (e.g. in systems having ten or fewer terminal sets), the central intelligence may actually reside in a "golden" telephone set that is specially designed to hold the central processing equipment.

Regardless of the form the central equipment takes, a number of terminal sets (e.g. wired or wireless telephone sets) are usually connected to the central equipment. The terminal sets are typically "dumb" devices in comparison to the central equipment. That is, terminal sets may simply send hookswitch information and key presses (e.g. Dual Tone Multi-Frequency or DTMF tones) to the central equipment and convert signals from the central equipment such as a dialtone, ringing tone, or voice signals into sound (or, in some cases, images or video). The terminal sets are typically unaware of the existence of any other terminal sets, and have no inherent capacity to interconnect themselves with another terminal set.

In centralized telephony systems, administration and discovery of telephone sets within a network is typically performed by the central equipment. For example, in a traditional circuit-switched Time Division Multiplexing (TDM) telephony system, for example, each terminal set may be connected to a port on the central call processing equipment. Typically, as part of an initialization sequence which occurs on power-up, each terminal set announces its availability to the central equipment. The central equipment monitors each port for such announcements as new terminal sets are connected, and is thus capable of "discovering" newly-added terminal sets.

In centralized Voice-over Internet Protocol (IP) or VoIP telephony systems, a very similar but slightly more complicated procedure is employed; however, a terminal set still announces its availability to the central call processing equipment via the network. As is known in the art, VoIP is the transmission of calls over a data network based on the IP. Communication takes the form of packet data, thus there is no fixed connection as in the case of circuit-switched networks. The communication can be text, voice, graphics or video. IP equipment may adhere to such standards as H.323 and Session Initiation Protocol (SIP) for interoperability. The H.323 standard generally describes how multimedia communication is to occur between terminals, network equipment and services. The SIP standard covers the technical requirements to set up, modify and tear down multimedia sessions over the Internet. As used herein, the term "call" refers to a multimedia communication between two endpoints, and includes a voice telephone call.

Regardless of whether central equipment is circuit switched or packet switched, during the course of discovering a new terminal set the central equipment will usually automatically assign and manage a Directory Number (DN), which is a form of network address. The DN may be, e.g., a PBX extension. As DNs are assigned to different sets, the DNs are added to a list of DNs maintained at the central equipment. Often, it is only on the basis of this centralized list that the centralized equipment is able to determine the identity of the physical terminal set that should be called when a DN is forwarded from a calling terminal set. DNs are only one example of data that may be maintained centrally by the central equipment for possible use by more than one terminal set. Other examples may include user names and user call handling options.

Another responsibility of the central equipment may be to inform terminal sets of the current date/time. Although each terminal set may be a digital device including a clock circuit which is capable of maintaining a local date/time (also referred to simply as "local time"), such clock circuits are usually susceptible to significant drift over time. Accordingly, multiple terminal sets initially indicating the same time that are left to advance time independently are likely to become further and further out of synchronization with respect to one another. For this reason, central equipment may be used to periodically synchronize interconnected terminal sets, e.g. by periodically instructing each terminal set to synchronize its local time with the time maintained by the central equipment, which is considered to be the correct "network time".

As the costs associated with greater processing capacity and memory continue to decrease, the inclusion of a call-processing engine in every telephone set connected to a network is becoming feasible. In such systems, it may be desirable to eliminate the central equipment. Such a decentralized system may be referred to as a distributed telephony system.

Disadvantageously, the above-described approach for synchronizing time across multiple terminal sets is ill-suited for a decentralized or distributed telephony system, since no centralized equipment may exist.

A problem related to time synchronization is maintaining synchronization (i.e. coherence) between copies of data at multiple terminal sets. In a distributed telephony system, each terminal set may be required to maintain its own local copy (i.e. version) of data which would have been maintained centrally in a centralized system. When a copy of data is changed at one terminal set (e.g. due to user input or an update by a system administrator), the updated copy at that terminal set will no longer be synchronized with (i.e. the same as) the copies of that data at other terminal sets. It will therefore usually be desirable or necessary to propagate the updated copy of the data to every other terminal set. Of course, it is possible for another copy of the same data to be changed at another terminal set nearly simultaneously with the first change. A reliable scheme of determining which of the two conflicting data values is preferable (i.e. which copy or version of the data should be maintained versus being discarded) is needed.

In some systems, timestamps have been used for resolution of data conflicts in these situations. The premise of such schemes is usually "most recent copy wins". Of course, in order for such schemes to operate reliably, network devices require a consistent view of time (referred as "network time"). In generalized computing environments, this may be achieved with the use of a time server. A time server is a computing device which maintains a more accurate representation of date/time than other network devices. Client network devices may refer to the time server using a standardized protocol to query network time and may then set their local time (applying time zone adjustments if necessary). Disadvantageously, however, such time servers may not be available in some networks.

In some synchronized telephony networks, millisecond-accurate network time is maintained using dedicated time signals, delivered over dedicated links. This approach may provide great accuracy, however such implementations are complex, and associated costs may be considered to be excessive.

Another problem associated with the use of timestamps to resolve data synchronization conflicts is that, in certain situations, the value of a timestamp associated with a changed piece of data may not be a reliable indicator of the relative age of that data. This is due to the fact that, in certain situations, clocks from which timestamps are generated may appear to "jump" in a non-linear fashion. For example, when clocks are adjusted for daylight savings time, time may appear to jump forward or backward by one hour. Alternatively, time may appear to jump forward or backward when a clock is reset by a system administrator. In these situations, data having a "newer" timestamp may actually represent an older copy of that data than a version having an "older" timestamp. As such, conventional timestamp-based synchronization techniques may not be adequate for data synchronization in distributed networks.

Accordingly, in a distributed telephony system, an alternative manner of synchronizing time between terminal sets and maintaining data coherence between terminal sets or other forms of network devices would be desirable. More generally, in distributed systems such as a peer-to-peer distributed multimedia communications systems, a manner of synchronizing time and maintaining data coherence between network devices would be desirable.

SUMMARY OF THE INVENTION

To synchronize time between network devices equally capable of accurately maintaining an indication of current time, one of the network devices is deemed to be a reference for time and the other network devices synchronize their indications of current time to the reference. To synchronize copies of data at multiple network devices, each network device maintains a counter representative of the passage of time but not necessarily of current time. The counter at each device is periodically synchronized with the counters of other network devices. When data is changed at a network device, the value of the counter at the time of changing is stored in association with the changed data. Stored counter values are used to determine whether a local copy or a remote copy of the data is likely more recent and therefore preferable. A further test may be applied if a counter value comparison is inconclusive.

In accordance with an aspect of the present invention there is provided at one network device of a plurality of network devices, a method comprising: maintaining a first counter to represent the passage of time such that the represented amount of passed time at any given moment is at least as large as the represented amount of passed time at any previous moment; and when data is changed to become changed data: storing in association with said changed data the value of said first counter at the time of changing of the data; and sending to another network device an indication of said changed data along with the value of said first counter at the time of changing of the data.

In accordance with another aspect of the present invention there is provided at one network device of a plurality of network devices, a method comprising: receiving indications of a current time from other network devices, each of said network devices being equally capable of maintaining an accurate representation of current time; determining which of said other network devices is a reference for time; and synchronizing a clock with an indication of a current time received from said reference for time.

In accordance with yet another aspect of the present invention there is provided a network device adapted to: maintain a first counter to represent the passage of time such that the represented amount of passed time at any given moment is at least as large as the represented amount of passed time at any previous moment; and when data is changed to become changed data: store in association with said changed data the value of said first counter at the time of changing of the data; and send to another network device an indication of said changed data along with the value of said first counter at the time of changing of the data.

In accordance with yet another aspect of the present invention there is provided a network device adapted to: receive indications of a current time from other network devices, each of said network devices being equally capable of maintaining an accurate representation of current time; determine which of said other network devices is a reference for time; and synchronize a clock with an indication of a current time received from said reference for time.

In accordance with yet another aspect of the present invention there is provided a machine-readable medium including machine-executable code for execution at one network device of a plurality of network devices, comprising: machine-executable code for maintaining a first counter to represent the passage of time such that the represented amount of passed time at any given moment is at least as large as the represented amount of passed time at any previous moment; and machine-executable code for, when data is changed to become changed data: storing in association with said changed data the value of said first counter at the time of changing of the data; and sending to another network device an indication of said changed data along with the value of said first counter at the time of changing of the data.

In accordance with yet another aspect of the present invention there is provided a machine-readable medium including machine-executable code for execution at one network device of a plurality of network devices, comprising: machine-executable code for receiving indications of a current time from other network devices, each of said network devices being equally capable of maintaining an accurate representation of current time; machine-executable code for determining which of said other network devices is a reference for time; and machine-executable code for synchronizing a clock with an indication of a current time received from said reference for time.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Exemplary embodiments of the invention will now be described with reference to the attached drawings in which.

DETAILED DESCRIPTION

Figure 1:
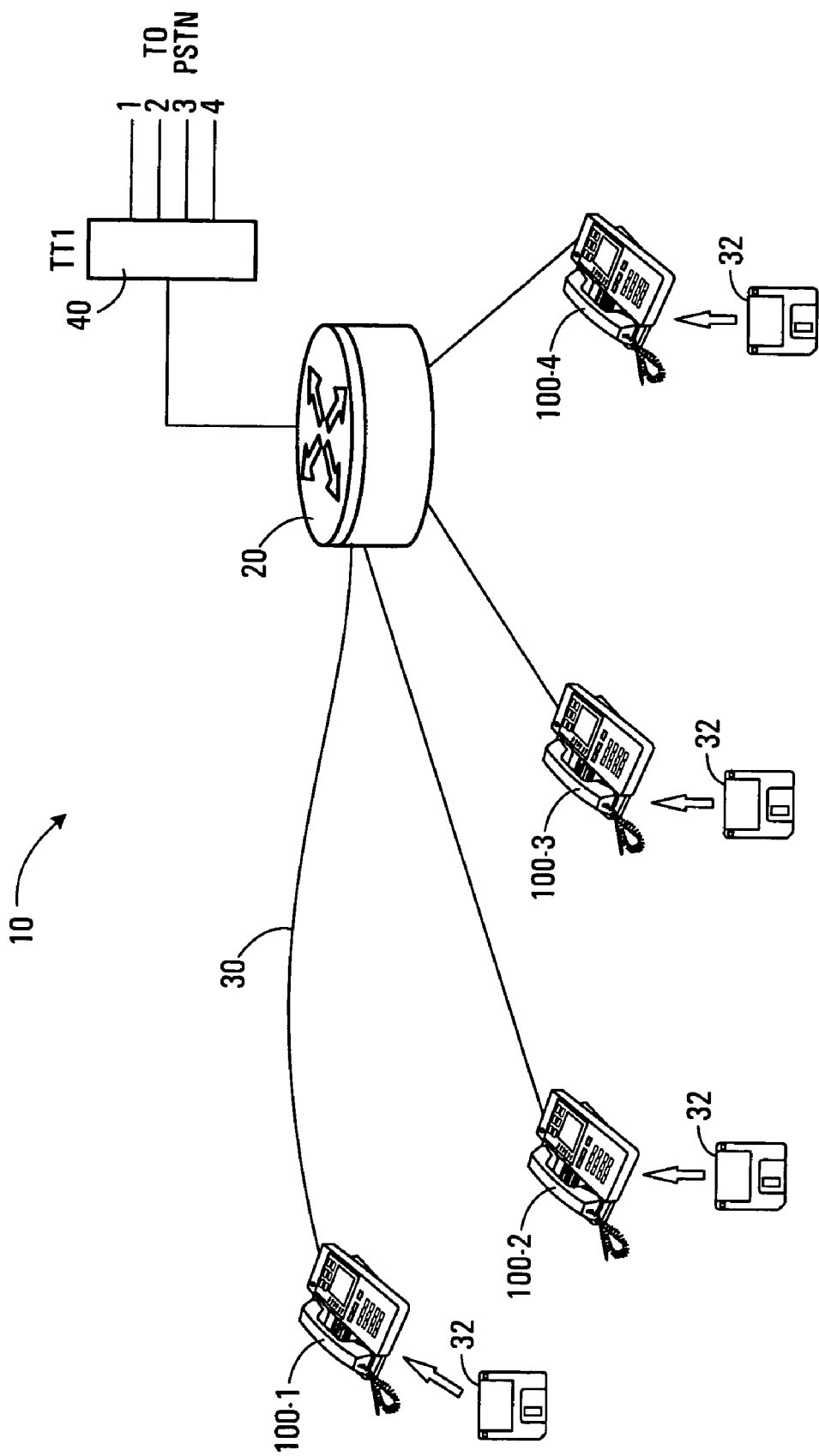
FIG. 1 is a telephone system including multiple networked terminal set ("peers") capable of time and data synchronization according to an embodiment of the invention.

In overview, it is desirable for each terminal set in an exemplary distributed telephony system lacking a central piece of routing or switching equipment (or, more generally, for each network device in a group of interconnected network devices) to maintain consistent representation of time (referred to as "network time"). For clarity, "network time" refers to a consistent view of time shared by multiple network devices on a network, which may or may not accurately reflect actual time. It is also desirable for time synchronization to be achieved without an excessive amount of communications overhead between terminal sets.

To achieve this result, each terminal set uses the same selection technique to select one of the terminal sets as a reference for time. Because the selection technique used by each terminal set is the same, each terminal set will choose the same terminal set as the reference for time. The selection is not based on a superior capacity of the selected terminal set for accurately maintaining time. Any technique which reliably selects one terminal set from multiple terminal sets may be used. For example, the terminal set having the lowest hardware address of any other active terminal set may be selected.

Once the reference for time has been selected, each terminal set periodically synchronizes its clock with timestamps in messages received from the reference for time. No synchronization is performed using timestamps in messages received from other terminal sets for purposes of consistency and in order to avoid excessive time synchronization processing.

It is also desirable for synchronization (i.e. coherence) to be maintained between copies of data stored at multiple terminal sets in a distributed telephony system (or more generally between multiple network devices). When data is changed at a given terminal set, the change should be reliably propagated to other terminal sets. In any given situation in which two different versions of the same data exist, a reliable manner of determining which version is "true" (i.e. preferable) should be consistently applied by every terminal set.

To achieve this result, each terminal set maintains a counter representative of the passage of time such that the represented amount of passed time at any given moment is at least as large as the represented amount of passed time at any previous moment (i.e., the counter cannot be reset to indicate an earlier moment in time). The counter is not indicative of current time, and is thus not impacted by such apparent non-linear jumps in clock settings such as daylight savings time or adjustment of local date/time; in such situations, the counter simply continues to track the passage of time.

In one embodiment, the counter at each terminal set is a monotonically increasing counter which increases to indicate the passage of time (e.g. is incremented every second).

The counter at a terminal set is periodically synchronized with the counters of other terminal sets. Synchronization involves comparing the current values of the counters at distinct terminal sets and advancing the counter whose value represents a lesser passage of time (which in the case of a monotonically increasing counter will be the smaller value) to match the counter representing a greater passage of time (the larger value).

When data is changed at a terminal set, a "snapshot" of the value of the counter at the time of changing is captured and stored in association with the changed data. Copies of the changed data are sent to other terminal sets along with the captured counter value. A recipient terminal set which has a local copy of the data will also have an associated stored counter value indicating the time of creation or last update of the local copy. The recipient compares the received counter value with the stored counter value. The data associated with the counter evidencing a longer passage of time (which, in the case of a monotonically increasing counter, will be the higher value counter) is deemed to be more recent and thus preferable; that data is kept by the recipient. If the local copy is found to be preferable, a copy is forwarded to the sending terminal set to allow that terminal set to store the preferable copy. If the counter values are equal, a further test (e.g. lowest hardware address) may be applied to uniformly settle upon a preferable data version.

In an alternative embodiment, the counter at each terminal set is a monotonically decreasing counter which decreases to indicate the passage of time (e.g. is decremented every second). In this case, smaller values would represent a greater passage of time and thus more recent data. In such embodiments, counter synchronization between terminal sets would entail setting the counter with the larger value to the smaller value.

Time and data synchronization capabilities may be provided in conjunction with peer discovery capabilities which permit the network device to recognize, and be recognized by, other network devices (peers) in a peer-to-peer network. An overview of peer discovery operation in an exemplary embodiment follows. This overview provides a context for the subsequent description of time and data synchronization operation.

Peer Discovery

In an exemplary distributed telephony system lacking a central piece of routing or switching equipment, certain features may be desirable. One desirable feature may be a capability of automatically assigning a unique DN to each terminal set upon initial connection of the terminal set to a network, preferably with an effort being made to minimize conflict between the DNs chosen by different terminal sets in the network. Another desirable or mandatory feature is to ensure that each terminal set is made aware of the DN of every other terminal set connected to the network, so that each terminal set is capable of making calls to other terminal sets. A further desirable feature is the capability of preserving a DN assigned to a terminal set even upon disconnection of the terminal set from the network or upon loss of power of the terminal set (either of these resulting in a terminal set becoming "inactive"). The motivation for preserving the DN may be to prevent the DN of the inactive terminal set from being reassigned as a result of temporary disconnection of the terminal set from the network (due to, e.g., a faulty connection between the terminal set and the network, a simple loss of power, or a wireless terminal set moving out of range), which reassignment could result in confusion on the part of a calling party as which terminal set has been called.

To support these features, a terminal set (e.g. a telephone set, Portable Digital Assistant (PDA), Personal Computer (PC), wireless terminal, Think Trunk Interface (TTI), or other network device) exemplary of an embodiment of the present invention, upon initial connection to a network in a "factory fresh" (i.e. as yet unconfigured) state, notifies the other terminal sets on the network (its "peers") of its connection the network by way of a network connection notification. The network connection notification includes a unique identifier associated with the terminal set, such as a Media Access Control (MAC) address for example. As is known in the art, a MAC address is a unique hardware address or hardware number which serves as a unique identifier for a network device. The network connection notification may take the form of an "I_AM_HERE" message which is sent multiple times in order to increase the likelihood that the message will be received (at least in the case where no acknowledgement is sent by the other peers for each received message, as in the present embodiment).

The newly-connected terminal set also receives existence notifications from other terminal sets. An existence notification is an indication of a the existence a terminal set which either currently has a presence on the network (i.e. is active and connected to the network) or previously had a presence on the network (i.e. was previously active and connected but has now become disconnected and inactive). In the present embodiment, an existence notification may be any of an "I_AM_HERE" message (previously described), a "PEER_ASSERT" message (described below), or an "INACTIVE_PEER_ASSERT" message (described below). Each existence notification includes the unique identifier of the terminal set in respect of which the message was sent. The latter two types of messages ("PEER_ASSERT" and "INACTIVE_PEER_ASSERT" messages) additionally provide an indication of already claimed DNs, and are only received when the newly-connected terminal set is joining a network in which at least one terminal set has already claimed a DN.

From the existence messages, a list of all of the terminal sets on the network (referred to as a routing table), is created. The terminal sets in the list are sorted by their unique network device identifiers. For any terminal sets which have already claimed DNs, the claimed DN will be indicated in the sorted list. The newly-connected terminal set will have an ordinal position within the list.

To select a prospective DN, the newly-connected terminal set may add an offset associated with its ordinal position in the list to a base DN. For example, in a system where the DN represents a PBX extension, assuming that the new terminal set is third in a list of five terminal sets, the prospective DN may be determined to be 203 (an offset equal to the terminal set's ordinal position, i.e. 3, plus a base DN of 200). By basing the selection of a prospective DN on the unique ordinal position associated with the terminal set, selection of unique prospective DNs by different terminal sets will be promoted. This assumes a scenario in which multiple factory-fresh terminal sets simultaneously join a network having no existing terminal sets with previously assigned DNs. The rationale is to try to prevent different terminal sets from initially selecting the same prospective DN, which may result in time-consuming conflict resolution processing.

Upon selecting its prospective DN, the newly-connected terminal set will then notify each other terminal set of its prospective DN. This is referred to as a "DN Probe". If no other terminal set objects to the claiming by the newly-connected terminal set of the prospective DN (with any objection possibly being based on an existing claim to that DN by one of the other terminal sets), the newly-connected terminal set claims the prospective DN as its own. The newly-connected terminal set may allow a pre-determined time interval to elapse before claiming its prospective DN, to provide sufficient time for the other terminal sets to raise any objections. Assuming that the prospective DN has been successfully claimed, the newly-connected terminal set notifies each other terminal set of its claim to that DN. The newly-connected set also stores the claimed DN in non-volatile memory, so that the assigned DN may be recalled if the terminal set loses power. The routing table may also be stored.

In the event that the newly-connected terminal set is joining an established network, the other terminal sets on the network may already have selected their DNs. In this case, it is possible that the prospective DN chosen by the newly-connected terminal set may already be assigned to one of the existing terminal sets. For example, if the ordinal position of the newly-connected terminal set within the sorted list of terminal sets is other than at the end of the list (e.g. if the unique identifier of the new terminal set places it somewhere in the middle of the sorted list), the prospective DN that will result when the offset associated with the ordinal position of the newly-connected terminal set is added to the base DN may represent the DN of one of the existing terminal sets.

In view of this possibility, before the newly-connected telephone attempts to notify any other terminal set of its prospective DN, it first consults its routing table to determine whether the prospective DN is already claimed by any other terminal sets in the network. If the prospective DN is already claimed by another set, the newly-connected DN may select another prospective DN, e.g. by adding an offset such as 1 to the largest DN found in the list, before notifying any of the other terminal sets of its choice. This may avoid unnecessary communications overhead on the network which might otherwise result if the newly-connected terminal set notifies each other terminal set of its prospective DN only to receive an objection from one of the other terminal sets which has already claimed that DN.

Once a newly-connected terminal set has successfully claimed a DN, the terminal set periodically notifies the other terminal sets on the network of its claim to that DN. In the present embodiment, each periodic notification takes the form of a "PEER_ASSERT" message which serves as a "heartbeat" of the newly-connected terminal set, indicating continued network presence and a continued claim to its DN. The notifications are monitored by the other terminal sets on the network. In the present embodiment, the periodic notifications occurs at random time intervals (e.g. between 0 and 2 seconds). If a predetermined amount of time elapses without receipt of a notification from a terminal set, that terminal set is presumed to have become inactive. The periodic notification also serves to prevent a subsequently-added terminal set from attempting to claim that DN as its own. For example, if another terminal set has selected that DN as its prospective DN and is awaiting any objection from other terminal sets, the notification may serve as an objection to the claim of that DN by that terminal set. Express objections (e.g. DN_CONFLICT messages) may also be sent.

If a terminal set that has claimed a DN disconnects from the network or loses power, it will likely be incapable of periodically notifying the other terminal sets on the network of its claim to its DN. In this case, another terminal set in the network which has become aware of the inactivity of the disconnected terminal set (e.g. by the absence of any recent PEER_ASSERT messages from that terminal set) steps in and begins periodically notifying the other terminal sets on the network of the fact that, although the disconnected terminal set is inactive, its DN has already been claimed. The terminal set which has stepped in, which is referred to as a "surrogate" for convenience, is responsible for sending these periodic notifications (which take the form of "INACTIVE_PEER_ASSERT" messages, described below) in addition to periodically notifying the other terminal sets of its claim to its own DN. An algorithm may be applied to decide which terminal set should be the surrogate for an inactive terminal set. The surrogate's periodic notifications sent on behalf of the inactive terminal set may prevent a subsequently-added terminal set from attempting to claim the DN of the disconnected terminal set as its own.

If the disconnected terminal set later reconnects with the network, it may resume notifying the other terminal sets of its DN (which it may recall from its non-volatile memory) on its own behalf. When the surrogate terminal set detects the reconnection, it may cease notifying the other terminal sets of the reconnected terminal set's DN, since the reconnected terminal set has reassumed this responsibility.

Referring to FIG. 1, shown is a telephony system 10 (or "telephone system 10") which makes use of peer discovery according to an embodiment of the invention. The telephone system 10 has a (Thin Trunk Interface) TTI 40 and a plurality of telephone sets 100-1 through 100-N (each a form of terminal set and a form of network device) connected to a Local Area Network (LAN) 30 through a switch 20. Alternatively, the switch 20 may be replaced with a network hub. Only four telephone sets are shown for clarity; however, there may be a total of N telephone sets where N>2 and furthermore, in some embodiments of the invention N is a large number, for example in the thousands. The Thin Trunk Interface 40 is, for example, a basic Analog or digital T1/E1 interface or any other PSTN interface and provides a local central office or (Public Switched Telephone Network) PSTN interworking interface and is coupled to a number of telephone "lines" 1, 2, 3, 4. Lines 1, 2, 3, 4 are wire pairs representative of facilities provided by a local central office or PSTN (not shown). In some embodiments of the invention, there are many lines requiring multiple Thin Trunk Interfaces. For example, if 8 lines are required to the PSTN then a second Thin Trunk Interface can be added to the system 10.

Unlike conventional centralized telephony systems, the system 10 of FIG. 1 features distributed call processing. This distributed call processing may feature a number of capabilities including distributed voice mail for example.

Figure 2:
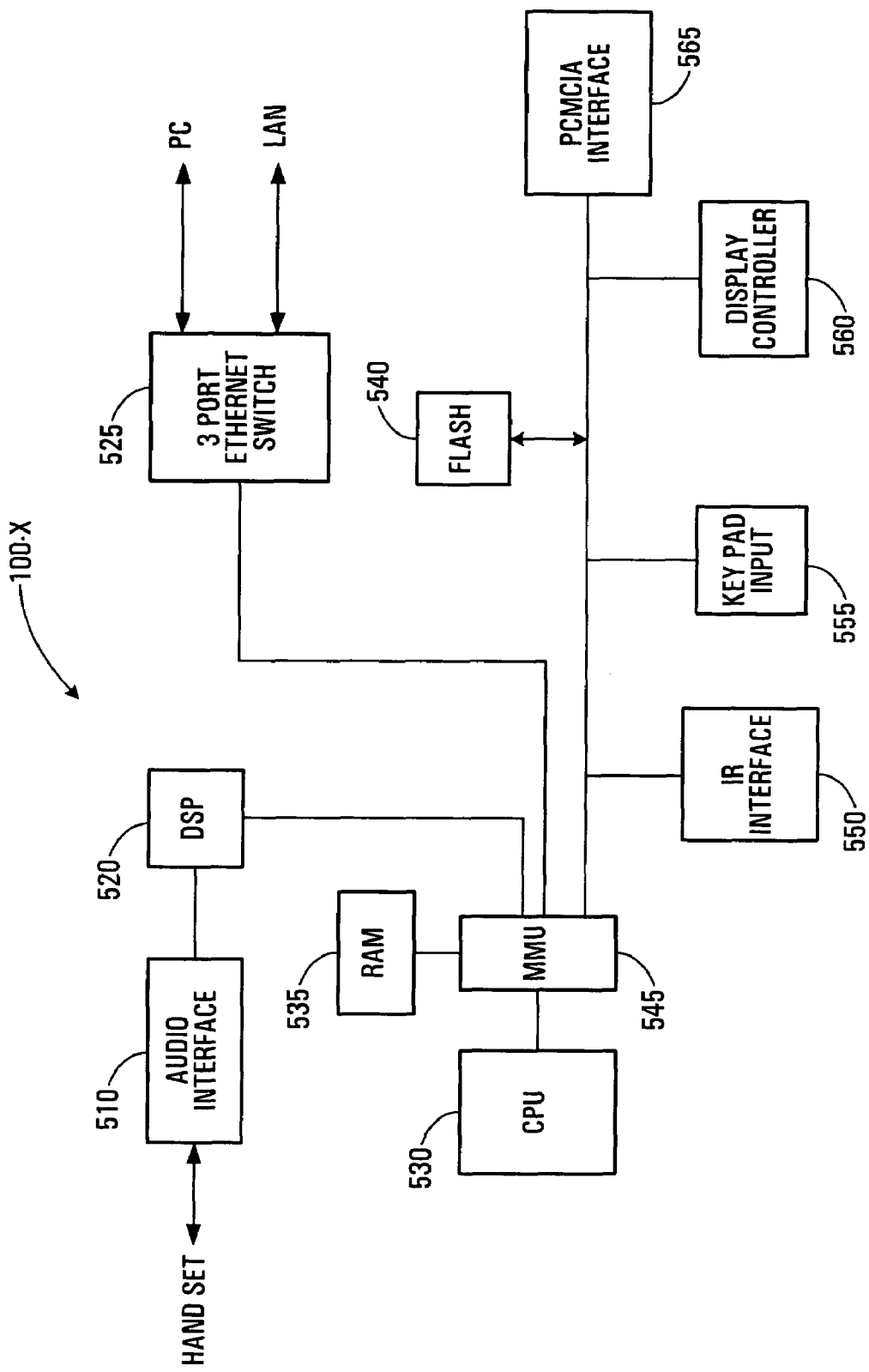
FIG. 2 is a partial circuit block diagram of a terminal set of the telephone system of FIG. 1.

Referring to FIG. 2, shown is a partial circuit block diagram of an exemplary telephone set 100-X (where X=1 to N) of the telephone system 10 of FIG. 1. A Central Processor Unit (CPU) 530, a Memory Management Unit (MMU) 545 and a Random Access Memory (RAM) 535 provide the basis of a computational device. This computational device is connected to a Digital Signal Processor (DSP) 520 for encoding and decoding audio signals. The DSP 520 connects to an audio interface 510. The computational device is also connected to a 3-port switch 525 to allow connection to a LAN and a Personal Computer (PC). The computational device is also connected to a host of peripherals such as a Flash non-volatile memory 540, an Infra Red (IR) interface 550, a Keypad and button interface 555, a Liquid Crystal Display (LCD) controller 560, and a Personal Computer Memory Card International Association (PCMCIA) Interface 565 to allow for standardized expansion of the terminal set 100. While a specific architecture is shown, more generally any packet based (e.g. Internet Protocol (IP)) telephone may be used, assuming sufficient processing and memory capacity is available to implement the methods described below. For example, an off-the-shelf IP phone such as those manufactured by Mitel, Nortel Networks, Avaya, Siemens, NEC, Pingtel or 3COM could be used (e.g. Nortel i2004, Siemens optiPoint 410, or Avaya 4610).

Figure 3:
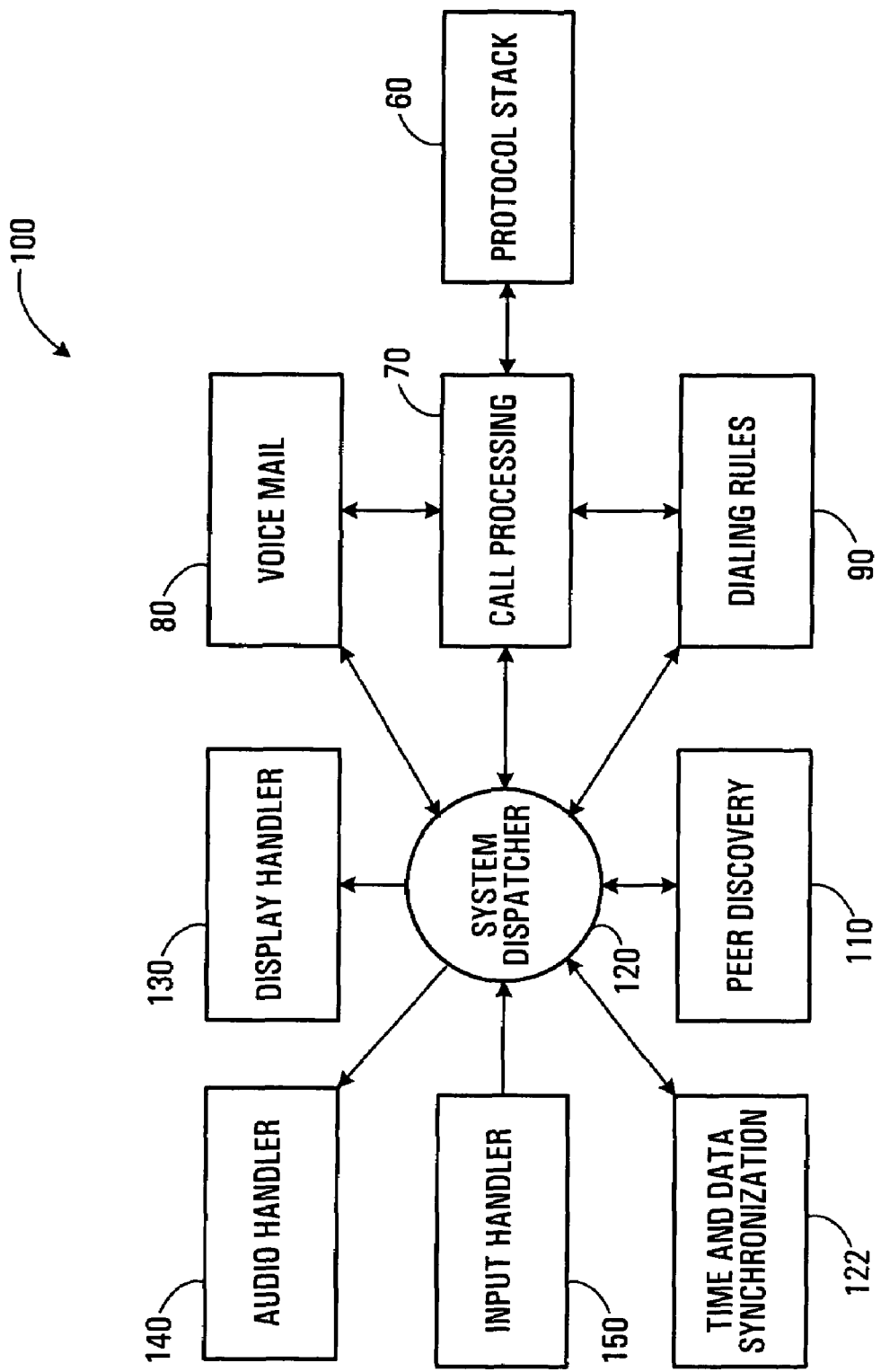
FIG. 3 is a functional block diagram of software operating on the terminal set of FIG. 2.

Referring to FIG. 3, shown is a functional block diagram of software operating on the telephone set 100-X of FIG. 2. The software is typically stored in RAM 535 of FIG. 2 and run on CPU 530, and may be loaded from a machine-readable medium 32 which could be a magnetic or optical disk, a tape, a chip, or another form of primary or secondary storage. More generally, the software can be implemented as any suitable combination of machine-executable code stored in memory for execution by general or special purpose processors, firmware, hardware, Application Specific Integrated Circuits (ASICs), Field-Programmable Gate Arrays (FPGAs), general or special purpose logic.

A system dispatcher 120 provides communication and scheduling between various functional elements which include a call processing module 70, a voice mail module 80, a dialing rules module 90, a peer discovery module 110, a time and data synchronization module 122, a display handler 130, an audio handler 140 and an input handler 150.

The call-processing module 70 interacts with a protocol stack 60 to set up and tear down a call, and set up voice channels. The call processing modules 70 of a number of sets collectively serve to deliver PBX-like call processing capabilities in a distributed fashion without the need for centralized equipment.

Voice mail module 80 provides voice mail service when a call is received and a user is unable to answer the call.

The dialing rules module 90 contains and applies a set of dialing rules for the call-processing module 70 which control how calls are made.

The peer discovery module 110 facilitates peer discovery when a terminal set 100-X is initially connected to a network, and is the focus of the present section ("PEER DISCOVERY").

The synchronization module 122 provides the terminal set 100-X with time and data synchronization capabilities for synchronizing its clock (not shown) with the clock of another terminal set which is a reference for time and for promoting coherence of its data with respect to other copies of the same data at other terminal sets on network 30. Module 122 will be described in the following section ("TIME AND DATA SYNCHRONIZATION").

The display handler 130 is responsible for formatting and displaying information to a user.

The audio handler 140 is adapted to play audio tones such as ringing, busy, call waiting tone or adapted to connect to a voice channel from the network to the handset speaker (or speaker phone) upon receipt of an audio message from the system dispatcher 120.

The input handler 150 is responsible for monitoring such functions as key press, hook switch, volume keys, hands free and mute button and for informing the system dispatcher 120 of appropriate actions to take.

Figure 4:
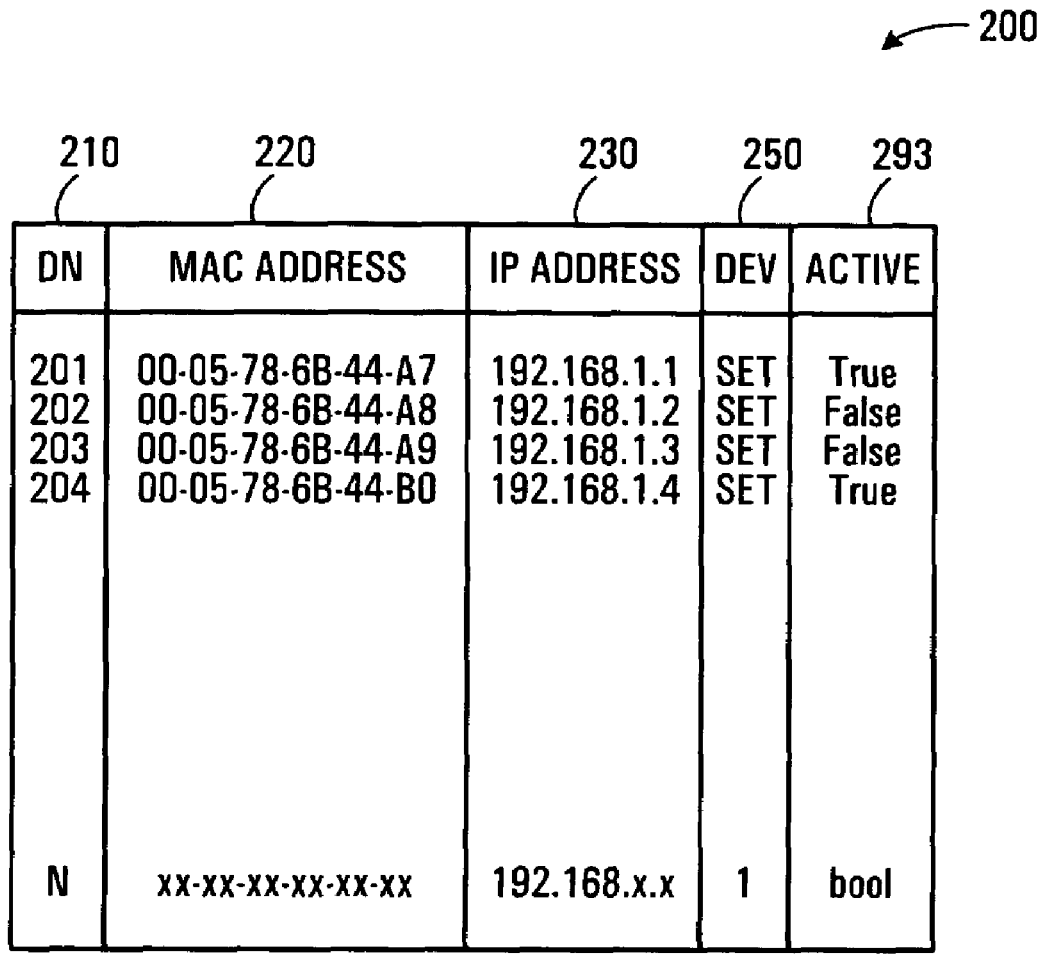
FIG. 4 is a routing table of the terminal set of FIG. 2.

FIG. 4 illustrates a routing table 200 that is created and maintained by each terminal set 100-X in the telephony system 10. The routing table represents an indication of the other terminal sets having a presence on the LAN 30 (including terminal sets which may have become inactive). As will be described, a terminal set 100-X creates routing table 200 by storing information from multiple "I_AM_HERE" messages, and possibly other types of messages (e.g. "PEER_ASSERT" messages), received from other terminal sets on the network 30. In the present embodiment, routing table 200 also includes an entry for the current terminal set 100-X, so that the table 200 represents a summary of all of the terminal sets associated with the network 30.

As shown in FIG. 4, the routing table 200 stores various types of information regarding each of the terminal sets having a presence on network 30, including a DN (column 210), MAC address (column 220), IP address (column 230), device type (column 250), and an active flag (column 293).

The DN (column 210) is a directory number, which is analogous to a PBX extension. When a DN appears in column 210 for a terminal set, that DN is understood to have been claimed by that terminal set. When a terminal set has not yet claimed a DN (e.g. if it has just announced its presence on the network 30 or has only selected a prospective DN which has not yet been decisively claimed), the column 210 will be empty for that terminal set. Although the DNs in column 210 are shown in ascending order in FIG. 4, it will be appreciated that the DNs could be in non-ascending or non-sequential order, depending upon the order in which the terminal sets are added to the network and other factors, as will become apparent.

The MAC address (column 220) is a unique hardware address or hardware number which serves as a unique identifier for each terminal set. As will be appreciated, MAC addresses may be used in the present embodiment to resolve conflicts when the same DN is selected by different terminal sets. A MAC address will be specified in column 220 for every terminal set appearing in the routing table 200. In the routing table 200, the terminal sets are sorted in ascending MAC address order. An alternative embodiment could sort the terminal sets in descending order.

The IP address (column 230) represents the IP address assigned to each terminal set, in the case of VoIP terminal sets for example.

Device type (column 250) is an indication of the type of each network device on the network 30. In the present example, each network device is a terminal set (identified by the value "SET" in column 250). In alternative embodiments, network device may include other types of devices, such as gateways or a thin trunk interfaces for example. Peer discovery as described herein may be performed for network devices regardless of device type.

The active flag (column 293) is an indication of whether or not a terminal set is currently active. As previously described, terminal sets periodically send PEER_ASSERT messages to other terminal sets to inform the other terminal sets that they are still active and to provide other information. If no PEER_ASSERT message has been received by an terminal set 100-X for a predetermined time interval (e.g. three times a predetermined fixed duration between PEER_ASSERT messages, which fixed duration may for example be two seconds), the status of the terminal set for which no PEER_ASSERT messages have been received is set to inactive in the routing table 200 maintained by terminal set 100-X. Once the inactive terminal set resumes sending PEER_ASSERT messages, the status of that terminal set is reset to active.

Figure 5:
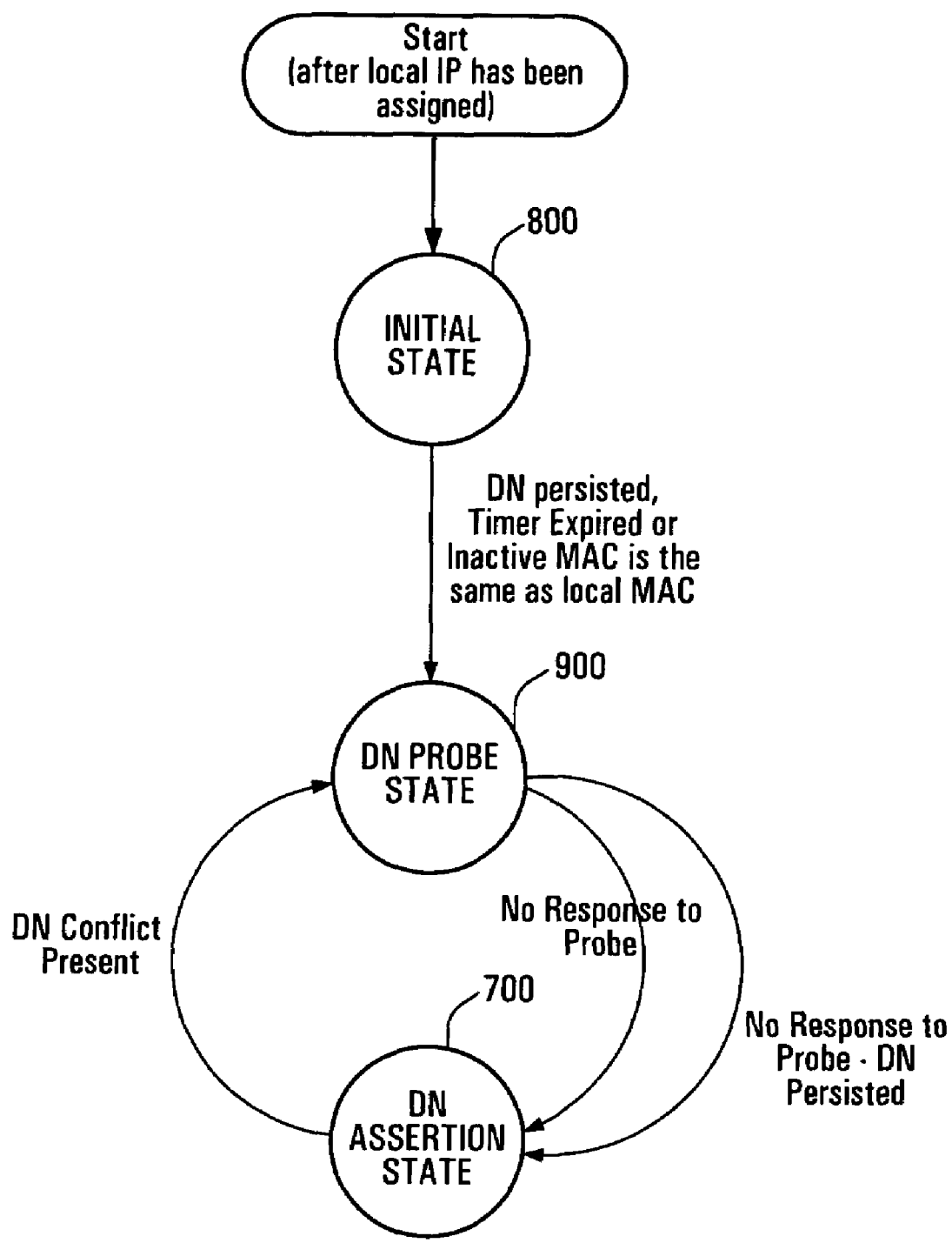
FIG. 5 is a state machine implemented by a terminal set during peer discovery.

FIG. 5 illustrates a state machine implemented by an exemplary terminal set 100-X during peer discovery according to an embodiment of the invention. For purposes of FIG. 5, is assumed that the terminal set 100-X, during the process of powering up and initialization, has obtained an IP address either from a Dynamic Host Configuration Protocol (DHCP) server on a respective network or by using a zeroconf (Internet Engineering Task Force standard, currently in Request For Comments (RFC) editor's queue as "draft-ietf-zeroconf-ipv4-linklocal-17.txt") in a manner that is known to those skilled in the art.

Once the IP address has been obtained the terminal 100-X set enters initial "I_AM_HERE" state 800 indicating that that terminal set 100-X has a presence on the network 30. In this state 800, terminal set 100-X "announces itself" by notifying the other terminal sets on network 30 of its presence on the network 30 and starts receiving notifications from other network devices regarding their presence on the network 30. In the present embodiment, the terminal set 100-X announces itself by way of an I_AM_HERE message containing the MAC address and IP address of the terminal set 100-X which is multicast to other terminal sets in the network. As is well-known by those skilled in the art, "multicasting" refers to the transmission of a single message to multiple recipients which may be a subset of the total number of potential recipients on a network. When the same message is to be sent to a group of recipients, multicasting may be more efficient that broadcasting (in which case all network devices, even those to whom the message is not intended, receive the message) and unicasting (point-to-point transmissions between two network devices, which is repeated once per intended recipient). In the case of VoIP terminal sets, the multicasting may be IP multicasting as described in RFC 1112 entitled "Host extensions for IP Multicasting", which will be familiar to those skilled in the art.

The terminal set sends the I_AM_HERE multicast message N times, where N is a positive integer greater or equal to 1. In embodiments in which terminal sets form part of a very large network, it is possible that several or all terminal sets be powered simultaneously and thus respective receive buffers at the terminal sets within the network may receive several messages at one time. In some embodiments of the invention, for each terminal set, N is equal to three or higher to ensure that the I_AM_HERE multicast messages are delivered to the other terminal sets even if the receive buffers have overflowed. The I_AM_HERE multicast messages are sent at random intervals (e.g. each between zero and two seconds). Sending the N I_AM_HERE messages at random intervals, rather than at fixed intervals, may reduce the risk of the I_AM_HERE multicast message not being received by one or more terminal sets. If fixed intervals were used, the order in which I_AM_HERE messages from different terminal sets would appear at a given terminal set during each of the N transmission intervals may be the same for each interval, and the messages arriving last may be consistently dropped. By sending messages at random intervals, the order in which messages arrive during one interval may differ from the order in which they arrive during another interval. Thus the terminal set(s) whose message(s) is (are) dropped may change from interval to interval, and there may be a greater likelihood that one of the N I_AM_HERE messages from a particular terminal set will be received.

It is noted that the above description assumes a messaging protocol in which the receipt of individual messages is not expressly acknowledged, which may be favored in view of a possible reduction in overall message traffic in comparison to a protocol in which an express acknowledgement is sent upon the successful receipt of a message.

While in Initial State 800, the terminal set 100-X also waits for messages from other terminal sets within the network 30 which contain information necessary to build or update the routing table 200 (FIG. 4).

From the Initial State 800, the state machine transitions to a DN Probe State 900 upon the occurrence of any of three events. The first event is the expiry of a predetermined time interval intended to provide sufficient time for the terminal set 100-X to receive I_AM_HERE messages from other terminal sets and build its routing table 200. The second event is a determination that the current terminal set 100-X already has a DN stored in its non-volatile memory. The third event is the receipt of an INACTIVE_PEER_ASSERT message having a MAC address which matches the MAC address of the current terminal set 100-X, which reflects a situation in which the current terminal set 100-X is returning to the active state and has just received an INACTIVE_PEER_ASSERT message sent on its behalf by its surrogate.

In the DN Probe State 900, the terminal set 100-X selects a prospective DN and sends M DN_PROBE multicast message to the other terminal sets to determine whether any of the other terminal sets have any objections to set 100-X claiming the prospective DN, where M is an integer greater than or equal to one. The rationale for possibly sending more than one DN_PROBE message is to increase the likelihood that each of the other terminal sets on the network will receive at least one copy of the message. In the present embodiment, the DN_PROBE message contains the MAC address and IP address of the sending terminal set as well as the prospective DN selected by the sending terminal set. If there is no response to the DN_PROBE messages from the other terminal sets, it is assumed that no other terminal set has any objection, and the terminal set 100-X enters a DN Assertion State 700 in which it claims the DN as its own. This is done regardless of whether the prospective DN of the current terminal set is a freshly selected DN or a persistent DN recalled from non-volatile memory.

The DN Assertion State 700 represents the steady state in which the terminal set 100-X has successfully claimed a DN. In this state, the terminal set 100-X periodically sends a PEER_ASSERT multicast message to the other terminal sets within the network to provide a periodic indicator that the terminal set remains active and "healthy". The PEER_ASSERT message of the present embodiment includes an IP address, a MAC address, and a claimed DN. The PEER_ASSERT message also includes the current value of a counter used to track the passage of time (as will be described in more detail in the "TIME AND DATA SYNCHRONIZATION" section, below). If a conflict is found to exist between the claimed DN and a DN claimed by another terminal set while in the DN Assertion State 700, the state machine transitions back to DN Probe State 900. An example of a situation in which a conflict may be found to exist may be the case in which a network becomes segmented into two sub-networks (e.g. upon failure of a Virtual Private Network (VPN) which normally interconnects two sub-networks in geographically remote locations). While the network is segmented, it is possible that terminal sets may be plugged into the separate segments, with different terminal sets on different sub-networks claiming the same DN. When the network segments are re-connected, a conflict may be found to exist. In this case, resolution of the conflict is necessary.

Figure 6:
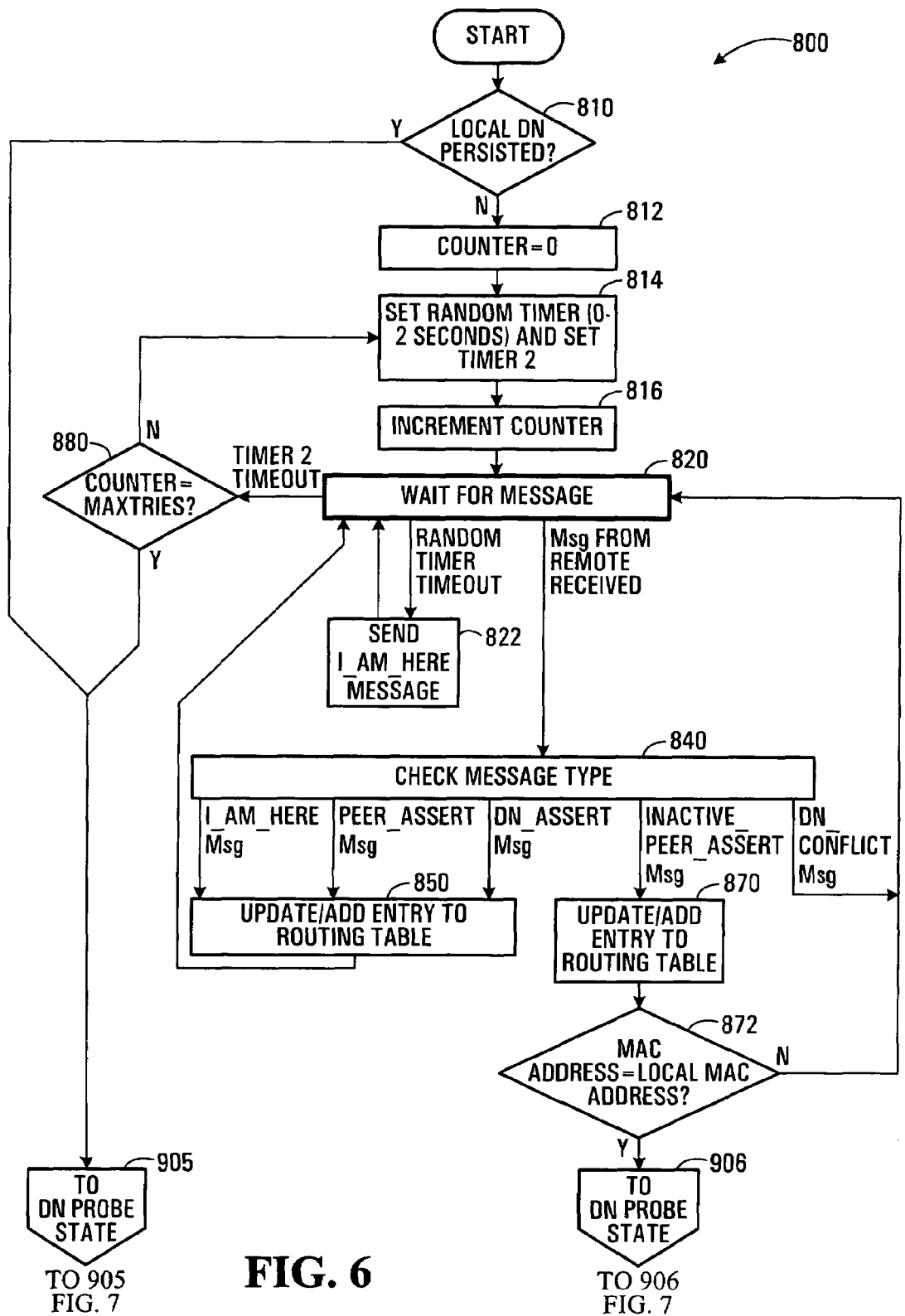
FIG. 6 is a flow chart illustrating operation of a terminal set in an Initial State shown in FIG. 5.

FIG. 6 is a flow chart illustrating operation of a terminal set 100-X in the Initial State 800 of FIG. 5. Initially, a determination is made as to whether or not a DN for the current terminal set 100-X has persisted (810). In the present embodiment, a DN will have persisted if the terminal set 100-X has previously been through the initialization state 800, the DN Probe State 900 and the DN Assertion State 700, so as to have previously claimed a DN. In this case the claimed DN will have been stored in non-volatile memory, such as a flash memory for example. The purpose of storing the DN in non-volatile memory is to preserve the DN in the event that the terminal set 100-X becomes inactive, e.g., due to accidental power loss or disconnection from the network 30, so that the DN may be reclaimed upon a return to an active state.

If it is determined at 810 that a DN has persisted for terminal set 100-X, the state machine transitions (905) to the DN Probe State 900. The presumption is that, in this case, the other terminal sets on the network will already have been notified of the presence of terminal set 100-X on the network, even if the other terminal sets currently consider the terminal set 100-X to be inactive.

If, on the other hand, it is determined at 810 that the terminal set does not have a persistent DN, this indicates that the terminal set 100-X is in an as-yet unconfigured (in terms of DN and routing table 200) "factory-fresh" condition. In this case, a counter used to track how many of the N instances of the I_AM_HERE message have been sent is initialized to zero (812). A random timer is then set between 0 and 2 seconds and a second timer is set for 2 seconds (814). The interval of 2 seconds for the second timer is to ensure that sufficient time is given to receive messages from other network devices for purposes of building routing table 200 (FIG. 4). Of course, this duration could differ in other embodiments. The counter is incremented (816) and the terminal set enters a "wait for message" state (820) in which it waits for a message to be received.

If the random timer expires while in the wait for message state, an I_AM_HERE multicast message is sent to the other terminal sets (822) and the terminal set 100-X returns to the wait for message state (820).

Any messages received from any other terminal set in the network at 820 are checked for a type (840).

If the received message is a DN_CONFLICT message, then the terminal set ignores the DN_CONFLICT message (since this message should not be received in the Initial State 800) and the state machine returns to the wait for message state (820).

If the received message is a I_AM_HERE message sent by another terminal set, then data from the received I_AM_HERE message (e.g. MAC address and IP address) is added to the routing table 200.

If the received message is a PEER_ASSERT message or a DN_PROBE message sent by another terminal set, then data within the PEER_ASSERT or DN_PROBE message may be added to the routing table 200 (these messages are described in more detail below).

If the received message is an INACTIVE_PEER_ASSERT, data contained within the INACTIVE_PEER_ASSERT message may be used to update the routing table 200 (870) (e.g. if the sending terminal set was not previously in the routing table 200, it may be added). Thereafter the MAC address in the INACTIVE_PEER_ASSERT message is compared to the local MAC address (i.e. the MAC address of the current terminal set 100-X) (872).

If they are found to be the same, this represents a situation in which the current terminal set 100-X is returning to an active state after a period of inactivity and has just received a message from another terminal set which is sending INACTIVE_PEER_ASSERT messages on behalf of terminal set 100-X. In this case, the terminal set will transition to the DN Probe State (905).

If, on the other hand, the MAC address in the received INACTIVE_PEER_ASSERT message is different from the local MAC address, then the terminal set returns to the wait for message state and waits for further messages (820).

When in the wait for message state, if the second timer expires, an assessment is made as to whether the counter has reached the maximum value of N (880).

If this assessment reveals that the value of the counter has not exceeded N, this indicates that fewer than N I_AM_HERE messages have been sent. In this case, the random timer and the second timer are reset (814) and the value of the counter is incremented (816) before returning to the wait state (820).

If, on the other hand, the assessment of 880 reveals that the value of the counter has is equal to N, this indicates that N I_AM_HERE messages have been sent. In this case, the state machine of terminal set 100-X transitions to the DN Probe State (906).

Figure 7:
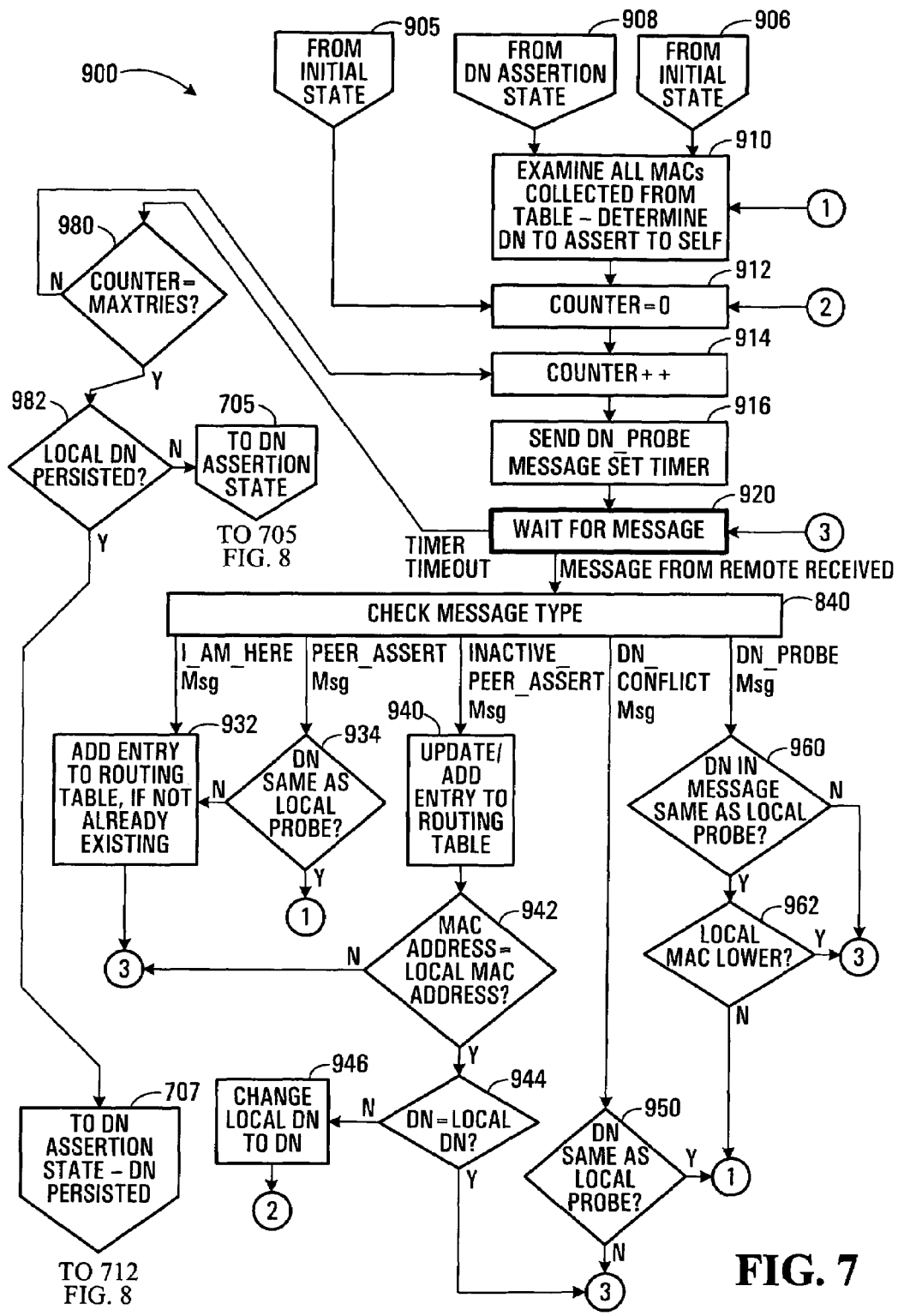
FIG. 7 is a flow chart illustrating operation of a terminal set in a Directory Number Probe State shown in FIG. 5.

FIG. 7 is a flow chart illustrating operation of a terminal set 100-X in the DN Probe State 900 of FIG. 5. As shown in FIG. 7, there are two entry points into the DN Probe State 900. The first entry point is from the Initial State 800 at 905, and represents a situation in which the current terminal set has recalled its DN from non-volatile memory after a period of inactivity. The second entry point is also from the Initial State 800, but at 906 and represents a situation in which the terminal set 100-X has not previously claimed a DN. In the latter case, the terminal set selects a prospective DN at 910 (in the former case, the prospective DN will be the recalled DN).

To select a prospective DN (910), the terminal set 100-X determines its ordinal position within the (sorted) list of terminal sets of routing table 200 (FIG. 4). For example, if terminal set 100-X is first in the list, the selected prospective DN may be 1 (its ordinal position) plus a base DN of, say, 200, for a prospective DN of 201. By basing the selection of a prospective DN on the unique ordinal position associated with the terminal set, selection of a unique prospective DN by each terminal set will be promoted in the scenario in which multiple factory-fresh terminal sets simultaneously join a network having no existing terminal sets with previously assigned DNs.

To guard against potential DN conflicts which may occur if terminal set 100-X is joining an established network, at 910 terminal set 100-x also consults its routing table 200 (FIG. 4) to determine whether the selected prospective DN is already assigned to another terminal set. If the prospective DN is already assigned, the newly-connected DN may select another prospective DN, e.g. by adding an offset such as 1 to the largest DN found in the list.

Following 910 (or from entry point 905), a counter whose purpose is to track the number of instances of the DN_PROBE message that have been sent is initialized (912) and incremented (914). An instance of the DN_PROBE message is sent and a timer used to count down the (fixed or random) time interval between DN_PROBE message instances is set (916). The terminal set 100-X then enters a "wait for event" state (920).

If a terminal set selects the same DN as another terminal set also in the probe state the terminal will look at the MAC address of both devices probed on the network a conflict is raised. In one embodiment, when there is conflict between terminal sets having the same DN, the terminal set having the lowest MAC address keeps the DN and the other terminal set must obtain another DN.

It is noted that a further entry point (908) into DN Probe State 900 exists from the DN Assertion State 700. This entry point 908 represents a situation in which a conflict has been found to exist between the DN claimed by the terminal set 100-X and the DN desired or claimed by one or more of the other terminal sets within the network. In such a case, operation commences at 910, described above.

From the wait for event state (920), if the timer expires, the terminal set 100-X ascertains whether the desired number M of DN_PROBE messages have already been sent (980). If it is determined that M DN_PROBE messages have already been sent, the terminal set next determines whether the prospective DN as been recalled from DN in the non-volatile memory (982). If the determination of 982 is made in the positive, the state machine transitions to the DN Assertion State 700 via 707; otherwise it transitions to the DN Assertion State 700 via 705.

Alternatively, if it is determined at 980 fewer than M DN_PROBE messages have been sent, operation returns to 914.

From the wait for event state (920), when a message is received from another terminal set, further operation depends upon the message type of the received message, which is ascertained at 930.

If the message type indicates an I_AM_HERE message, the terminal set adds data contained within the I_AM_HERE message to the routing table 200 if the data is not already present (932) before returning to the wait for event state (920).

If the message type indicates a PEER_ASSERT message, the DN from the PEER_ASSERT message compared to the local DN (i.e. the selected prospective DN)(934). If the DNs match, this represents a situation in which another terminal set is asserting the DN that terminal set 110-X has tentatively selected. In this case, operation returns to 910. If, on the other hand, the DNs do not match, the routing table 200 is updated with the data contained in PEER_ASSERT message if an entry for the terminal which sent the PEER_ASSERT message already exists, or if the entry does not already exist, the data contained in the PEER_ASSERT message is added to the routing table 200 to create the entry (932).

If the message type indicates an INACTIVE_PEER_ASSERT message has been received, the data contained in the INACTIVE_PEER_ASSERT message is added to the routing table 200 if an entry does not already exist or the routing table 200 is updated with the data if the entry does exist (940). Then the MAC address within the INACTIVE_PEER_ASSERT message is compared to the MAC address of terminal set 100-X (942).

If the MAC addresses differ, then the terminal set 100-X returns to the wait for event state (920).

Alternatively, if the MAC addresses are the same, this represents a situation in which the current terminal set 100-X is returning to an active state after a period of inactivity and has just received a message from another terminal set which is sending INACTIVE_PEER_ASSERT messages on behalf of terminal set 100-X. In this case, a further comparison is made (944) between the DN within the INACTIVE_PEER_ASSERT message and the DN currently being probed (i.e. the selected prospective DN).

If the DNs do not match, this represents a situation in which the terminal set 100-X is currently probing a DN which differs from the DN specified in the INACTIVE_PEER_ASSERT message. This may occur if the persistent DN stored in non-volatile memory of the terminal set 100-X was cleared or became corrupted while the terminal set 100-X was inactive. In this case, to prevent the terminal set 100-X from probing a different DN that was previously claimed, the selected prospective DN is reset to the DN from the message (946), and operation returns to 912 so that the terminal set 100-X will take steps to probe its previously claimed DN.

Alternatively, if the DNs are found to match (at 944), this represents a situation in which the terminal set 100-X is currently probing the same DN as is specified in the INACTIVE_PEER_ASSERT message, which should represent the DN previously claimed by terminal set 100-X before it was determined to be inactive. In this case, operation returns to the wait for event state (920).

If the message type indicates a DN_CONFLICT message is being received, this may represent a situation in which another terminal set is objecting to the probed prospective DN. In this case, a comparison is made (950) between the DN within the DN_CONFLICT message and the DN currently being probed.

If the DNs do not match, no further action is taken with respect to the DN_CONFLICT message, and operation returns to the wait for event state (920). In the case where the DN_CONFLICT message is multicast, this represents ignoring a DN_CONFLICT message intended for another terminal set. In the case where the DN_CONFLICT message is unicast, this may represent a situation in which a second of two DN_CONFLICT messages from different terminal sets has been received and is being ignored because, since the first DN_CONFLICT message was received, the current terminal set has begun probing a different DN than it had probed earlier.

Alternatively, if the DNs are found to match at 950, this represents a situation in which another terminal set is objecting to the DN prospectively selected by the current terminal set 100-X. In this case, operation returns to 910 so that another prospective DN may be selected and probed.

If the message type indicates a DN_PROBE message has been received, another terminal set is probing a selected prospective DN in much the same manner as the current terminal set 100-X is probing its selected prospective DN. The prospective DN of the other terminal set (which is indicated in the incoming DN_PROBE message) is compared to the locally selected prospective DN (960).

If the DNs do not match, no further action is taken with respect to the incoming DN_PROBE message, and operation returns to the wait for event state (920).

Alternatively, if the DNs are found to match at 960, this means that another terminal set is probing the same DN as the current terminal set 100-X. In this case, a conflict exists between the prospective DNs. In the present embodiment, such conflicts are resolved on the basis of the unique MAC addresses of the respective terminal sets. In particular, the terminal set having the lowest MAC address ("lowest active MAC" or LAM) is allowed to claim the DN, and the other terminal set will select another DN. It will be appreciated that other equally valid conflict resolution schemes may be applied. For example, the highest active MAC may be allowed to claim the DN in an alternative embodiment. The details of the chosen scheme are not important as long as the scheme is consistently applied at each terminal set.

Thus, according to the operative conflict resolution scheme, the MAC address within the DN_PROBE message is compared to the local MAC address (962). If the MAC address within the DN_PROBE message has a lower value than that of the local MAC address, the other terminal set is permitted to claim the DN, and the current terminal set returns to 910 to select another prospective DN. Otherwise, the terminal set ignores the DN_PROBE message by returns to the wait for event state (920), effectively maintaining its prospective DN.

Figure 8:
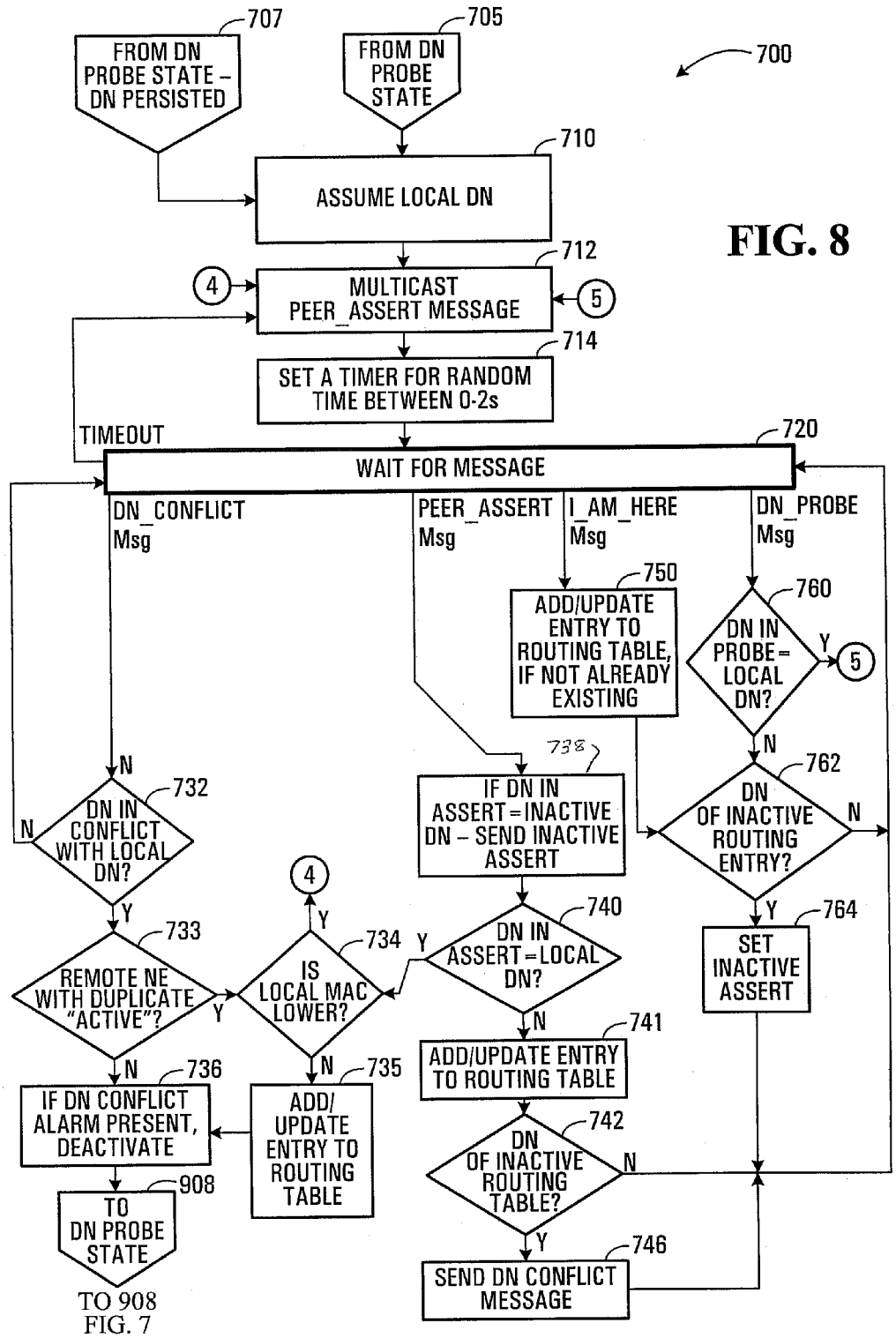
FIG. 8 is a flow chart illustrating operation of a terminal set in a DN Assertion State shown in FIG. 5.

FIG. 8 is a flow chart illustrating operation of the terminal set 100-X in the DN assertion state shown in FIG. 5. As previously described, the terminal set may transition into this state from the DN Probe State 900 without a persistent DN (705). In this case, the terminal set 100-X initially assumes the prospective DN which was just probed in the DN Probe State 900 (710). Subsequently, a multicast PEER_ASSERT message sent to other terminal sets on the network (712).

Alternatively, the terminal set may transition from the DN Probe State 900 with a persistent DN (707), in which case operation begins at 712.

Following 712, a timer is set for a random time interval between 0 seconds and 2 seconds (714). The terminal set 100-X then waits for a message to be received or for a timer to expire in the "wait for message" state (720).

If the timer expires, operation returns to 712, and another multicast PEER_ASSERT message is sent.

If a DN_CONFLICT message is received, then the terminal set verifies whether the DN contained in the DN_CONFLICT message is in conflict with the local DN (732).

If it is determined that the DN contained in the DN_CONFLICT message matches the locally claimed DN, this is indicative of a conflict due to duplicate DNs on the network. In this case, a further assessment is made as to whether the remote conflicting terminal set is active (733).

If the remote set is found to be active, and if the operative conflict resolution scheme (i.e. lowest active MAC address prevails) indicates that the current terminal set should keep its claimed DN (734), operation returns to 712, causing the terminal set to immediately send another PEER_ASSERT message.

If, on the other hand, it is determined in 734 that the current terminal set should not keep its claimed DN, the routing table 200 (FIG. 4) is updated with the data in the DN_CONFLICT message (735). Specifically, the terminal set having the conflicting DN may be added to the routing table 200, along with its DN. This is so that, on a subsequent selection by the current terminal set 100-X of a prospective DN which happens to match the conflicting DN, a check of the prospective DN against the DNs in the routing table 200 will reveal the conflict.

Thereafter, any conflict alarms are deactivated (736) and the terminal set 100-X transitions to the DN Probe State 900 (908). A conflict alarm is a notification of a DN conflict which may be sent to a system administrator in some embodiments of the invention. Conflict alarms are usually raised only in cases where a system administrator has manually reset a DN to an existing terminal set's claimed DN.

If it is determined at 733 that the remote terminal device is inactive, then any DN present conflict alarms are deactivated (736) and the terminal set transitions to the DN Probe State 900 (908).

Referring again to the wait for message state 720, if a PEER_ASSERT message is received, and if the DN in the PEER_ASSERT message is equal to a DN of one or more inactive terminal sets in the routing table 200, this represents a situation in which the current terminal set 100-X may be required to send an INACTIVE_PEER_ASSERT message on behalf of an inactive terminal set. This situation may arise for example where a network becomes segmented into two sub-networks such that terminal sets on one sub-network consider terminal sets on another sub-network to be inactive. A terminal set on one sub-network may be sending PEER_ASSERT messages while its surrogate, which is on the other sub-network, is sending INACTIVE_PEER_ASSERT messages on its behalf. On reconnection of the sub-networks, the surrogate could receive a PEER_ASSERT from the terminal set it still believes to be inactive.

The determination of whether the current terminal set 100-X should to send an INACTIVE_PEER_ASSERT message on behalf of an inactive terminal set based on an operative scheme for determining which terminal set is responsible (or which terminal sets are responsible) for sending INACTIVE_PEER_ASSERT messages on behalf of an inactive peer. In the present embodiment, the operative scheme assigns this responsibility to one and only one terminal set per given inactive peer (with the same terminal set possibly being responsible for multiple inactive peers). The rationale for making only one terminal set responsible for sending INACTIVE_PEER_ASSERT messages for any given inactive peer is to avoid unnecessary transmission of duplicate INACTIVE_PEER_ASSERT messages. For such schemes, it is desirable to ensure that each terminal set stays within its Initial State 800 (FIG. 5) for a duration that is longer than the time required to detect an inactive terminal set.

The operative scheme is illustrated in Table 1 below:

TABLE 1

Peers Responsible for Inactive Peer Asserts

| Tel. set | State | Sends Inactive Asserts? | On behalf of? |
|---|---|---|---|
| A | Inactive | — | — |
| B | Active | Yes | B |
| C | Inactive | — | — |
| D | Active | No | — |
| E | Active | Yes | F, G |
| F | Inactive | — | — |
| G | Inactive | — | — |
| H | Active | Yes | A |

The first two columns of Table 1 represent a subset of the information maintained in the routing table 200 of FIG. 4 which is relevant to the determination of "surrogate" peers (i.e. peers responsible for sending INACTIVE_PEER_ASSERT messages on behalf of other inactive peers). Each row in Table 1 represents a network device, as identified in the first column, in a hypothetical network. The network devices of Table 1 are understood to be sorted by some unique identifier, such as MAC address, as in routing table 200. The active or inactive status of each network device is provided in the second column of Table 1.

In the operative scheme, an active network device acts as the surrogate for each inactive network device which follows it (i.e. is in a lower row) in Table 1 with no active network device interceding in the list between the surrogate and the inactive network device. For example, as shown in Table 1, network device E acts as the surrogate for network devices F and G, since both of those devices are inactive and follow device E with no other active device interceding between them and device E.

In the event that an inactive network device precedes the first active network device within the sorted list (e.g., as is the case for network device A), then the last active network device within the sorted list (network device H) will acts as its surrogate.

It will be appreciated that other schemes for assigning surrogates may be adopted in alternative embodiments. For example, one alternative scheme may assign an active network device as a surrogate for inactive devices preceding it, rather than succeeding it, in the routing table. In another scheme, a network device may act as a surrogate for all inactive devices adjacent to it within the table, with the term "adjacent" as used herein including multiple contiguous inactive network devices either immediately above or immediately below a surrogate within a routing table. In the latter scheme, each inactive network device will have two surrogates. This level of redundancy may be desired in some embodiments.

Referring again to FIG. 8, following 738, terminal set 100-X verifies whether a DN contained in the received PEER_ASSERT message matches to the locally claimed DN (740). If they match, operation proceeds with 734 as previously described. If the DNs do not match, the terminal set 100-X either adds the data within the PEER_ASSERT message to the routing table or uses it to update the relevant entry in the table (741).

Next, an assessment is made as to whether the DN contained in the PEER_ASSERT message corresponds to a DN of an inactive entry for which the current terminal set 100-X acts as a surrogate (742). If the assessment is made in the positive, a DN_CONFLICT message is sent as a multicast message indicating a conflict in DNs (746) before returning to 720 to wait for another message. If the assessment of 742 is made in the negative, the terminal set 100-X immediately returns to 720 to wait for another message.

If an I_AM_HERE message is received while in the wait for message state 720, the terminal set 100-X adds or updates the entry in the routing table 200 (FIG. 4) which corresponds to the terminal set from which the I_AM_HERE message originated with data from the I_AM_HERE message (750), and then proceeds to 762 (described below).

If a DN_PROBE message is received at 720, the terminal set compares the DN in the DN_PROBE message with the locally claimed DN (760). If they match, this represents a situation in which another terminal set has selected the claimed DN of the current terminal set 100-X as its prospective DN. In this case, operation returns to 712 to immediately transmit a multicast PEER_ASSERT message to effectively notify the other terminal set that the DN which it has tentatively selected is already claimed.

If the comparison of 760 shows that the DNs do not match, terminal set 100-X consults the routing table 200 to determine whether the DN contained in the DN_PROBE message corresponds to a DN of an inactive terminal set (762). If the DN contained in the DN_PROBE message corresponds to an inactive terminal set, an INACTIVE_ASSERT_MESSAGE message is sent to a terminal set from which the DN_PROBE message originated, presuming that the current terminal set is deemed to be the surrogate for that inactive terminal set (using the above-described operative scheme). Thereafter, operation returns to 720 to await another message. If the consultation performed in 762 indicates that the originator of the DN_PROBE message is active, terminal set 100-X returns directly to 720 to wait for another message.

Thus, summarizing peer discovery operation, when multiple terminal sets implementing the state machine of FIG. 5 are connected to a network and engage in the above-described operation to arrive at the steady state (i.e. the DN Assertion State 700), each will have automatically selected a DN, with any DN conflicts between terminal sets having been automatically resolved without the need for human intervention. Moreover, each terminal set will have automatically created a local routing table 200 including the DN of every other terminal set on the network paired with other information (e.g. IP addresses) sufficient to permit the terminal set to call any other terminal set upon the dialing of that terminal set's DN. Moreover, even if the terminal set becomes inactive, when it is reconnected to the network its DN will persist.

Time and Data Synchronization

Figure 9:
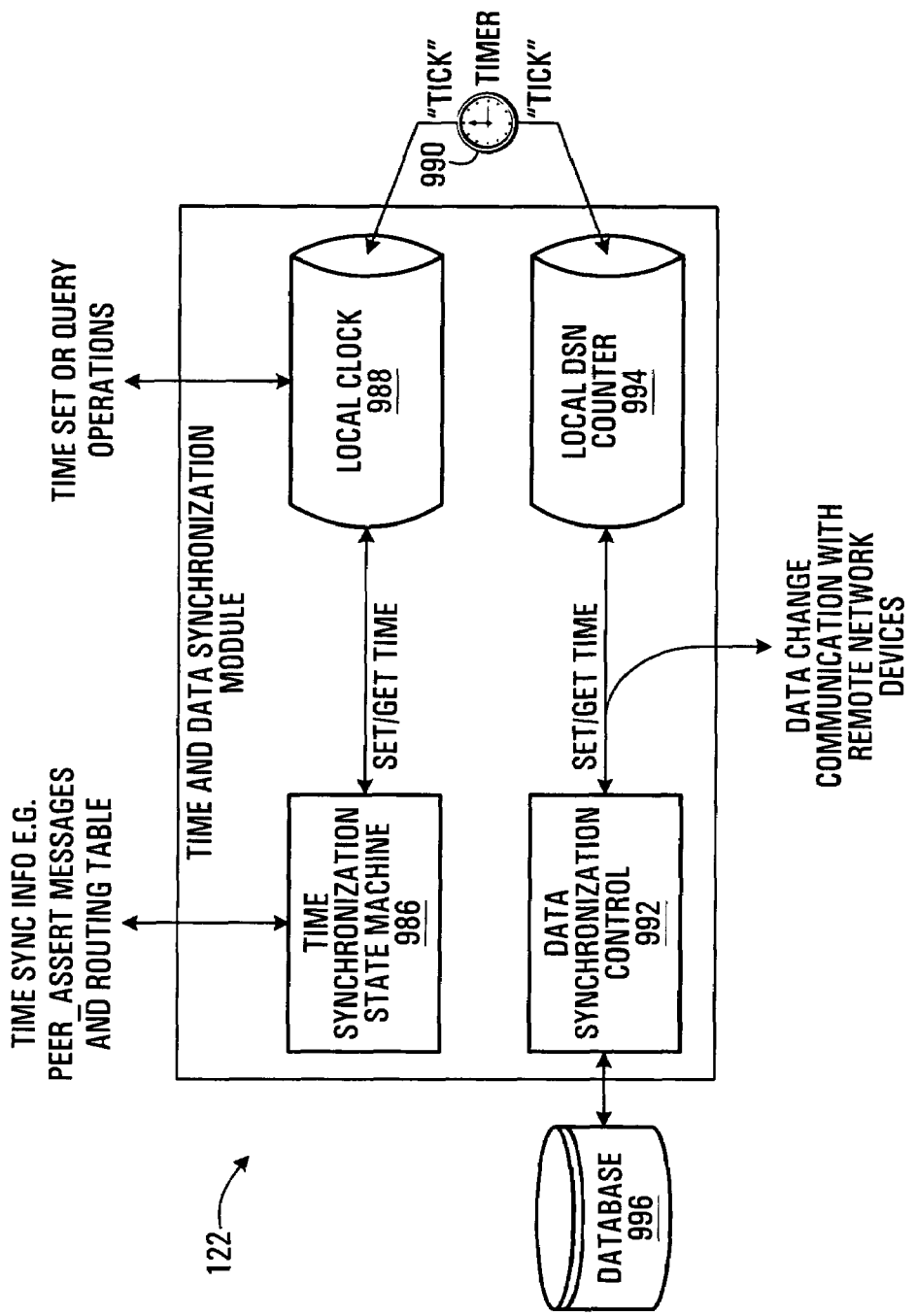
FIG. 9 illustrates a time and data synchronization module shown in FIG. 3 in greater detail.

In the present embodiment, time synchronization and data synchronization are performed the by time and data synchronization module 122 (FIG. 3), which is illustrated in greater detail in FIG. 9.

As illustrated, the time and data synchronization module 122 includes time synchronization components including a time synchronization state machine 986 and clock 988 indicating local time (also referred to as a "local clock 988"). These components are used for purposes of time synchronization between terminal sets. The time synchronization state machine 986 governs operation for periodically synchronizing the local clock 988 of the current terminal set with local clocks 988 of other terminal sets. Between time synchronizations, the clock 988 advances by receiving regular indications of the passage of a predetermined time interval (referred to as "ticks" for convenience) which may for example be one second time intervals (or other durations depending upon the needs of the specific application). Ticks are provided by a timer 990, possibly in the form of interrupts to software entities.

Module 122 also includes data synchronization components comprising a data synchronization control module 992 and a local Data Sequence Number (DSN) counter 994. Data synchronization module 992 governs operation for synchronizing local copies of data with copies of data at remote terminal sets. In the present embodiment, local DSN counter 994 in each terminal set is a monotonically increasing counter. As known to those skilled in the art, a function that is "monotonically increasing" is defined as a function from a partially ordered domain to a partially ordered range such that x>y implies f(x)>f(y). The counter 994 represents the passage of time but not necessarily the current time. The DSN of the present embodiment is a monotonically increasing value maintained by the counter 994. Higher DSN values represent later moments in time than smaller DSN values. The value of the DSN is incremented upon each "tick" from timer 990 (FIG. 9), and may occasionally be advanced non-linearly (i.e. by more than one "tick") as necessary to synchronize the local DSN with the DSN at remote terminal sets. As will be described, module 992 uses the value of local DSN counter 994 to determine whether a local copy of data or a remote copy of data is likely more recent and therefore preferable. In the present embodiment, data is stored at each terminal set within a database 996 that is local to the terminal set.

As an illustrative example, operation for time and data synchronization will be described in the context of peer discovery operation as provided by peer discovery module 110 (FIG. 3, described above). However, it should be appreciated that time and date synchronization between network devices may be performed outside the context of peer discovery.

Beginning with time synchronization, the objective of time synchronization is to provide a mechanism whereby multiple network devices have a consistent view of time, referred to as "network time".

Figure 10:
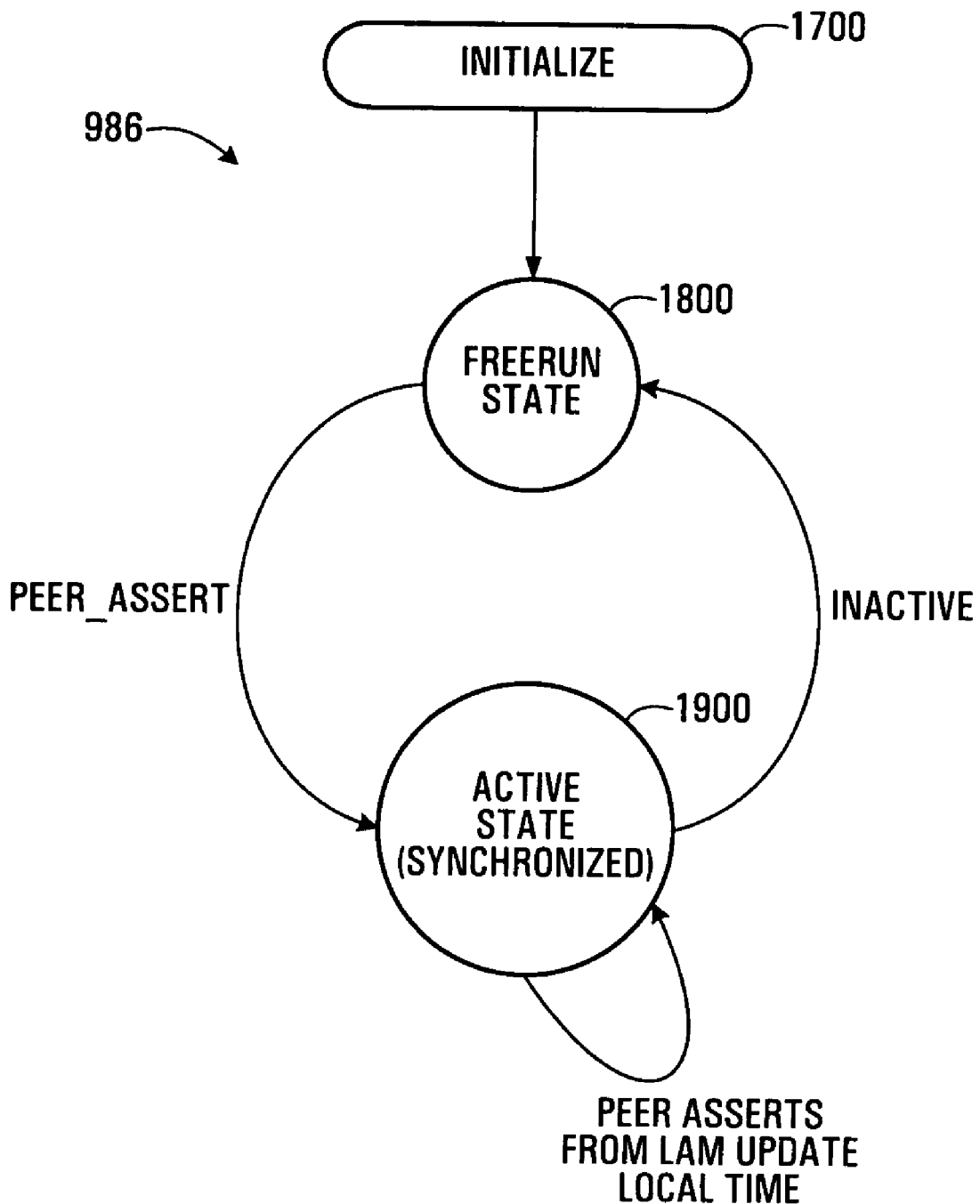
FIG. 10 illustrates a state machine which governs time synchronization between the terminal sets of FIG. 1.

FIG. 10 illustrates the state machine 986 of FIG. 9 which governs time synchronization between terminal sets. FIG. 10 will be described from the perspective of an exemplary terminal set 100-1 executing the state machine 986. It will be appreciated that the other terminal sets 100-2, 100-3 and 1004 also execute the same state machine 986, in a similar manner.

Initially (e.g. upon power-up of the terminal set 100-1), terminal set 100-1 enters an Initialization State 1700. In the Initialization State 1700, the terminal set 100-1 initializes its local clock 988 (FIG. 9), in a manner that will be described below in conjunction with FIG. 11. Initialization of the local clock 988 allows the terminal set 100-1 to begin the process of peer discovery before having an accurate knowledge of "network time".

When the local time initialization is complete, the terminal set 100-1 transitions to a Free Run State 1800. In the Free Run state, the clock 988 at terminal set 100-1 is advanced in accordance with "ticks" received from the timer 990 (FIG. 9). Because no time synchronization has yet been performed with other terminal sets, it will be appreciated that the local time at terminal set 100-1 may differ from the local time maintained at other terminal sets. The Free Run State 1800 may coincide with the DN Probe state 900 of FIG. 5.

Upon receipt of a PEER_ASSERT message, terminal set 100-1 transitions to an Active State 1900. Initially, the terminal set 100-1 synchronizes its local clock 988 with a timestamp appearing in the received the PEER_ASSERT message. It will be appreciated that this synchronization is performed regardless of whether the network device which sent the PEER_ASSERT message has been deemed to be a reference for time. Rather, the clock is reset upon receipt of a PEER_ASSERT message from any terminal set, based on an implicit understanding that any terminal set (or other network device) which has sent a PEER_ASSERT message has entered its DN Assertion state 700 (FIG. 5). When in the DN Assertion State 700, a network device will either have already been synchronized with "network time", or it will be the only active network device on the network and will thus represent de facto network time.

When in the Active State 1900, the terminal set 100-1 periodically re-synchronizes its local clock 988 with the timestamps in received PEER_ASSERT messages. However, to avoid excessive processing overhead which may result when many terminal sets are actively sending PEER_ASSERT messages on a network, re-synchronizing is not performed with every received PEER_ASSERT message. Rather, synchronization is only performed using PEER_ASSERT messages received from one network device (e.g. another terminal set or some other network device) which has been deemed to be a reference for time (also referred to as the "master reference").

The choice of a master reference for network time is not based on a capacity of the master network device for maintaining time any more accurately than any other network device. Rather, the choice of a master reference for network time simply a unique identification of one network device as the network device with which time synchronization should be performed. Each network device should be equally capable of reliably identifying the master reference. The goal of the time synchronization scheme is to ensure that the local time all network devices is synchronized, not necessarily for the synchronized local time to accurately reflect actual time. Ensuring that the common "network time" reflects actual time (e.g. as maintained by a stratum 3 clock, such as a Public Switched Telephone Network (PSTN) switch for example) may be handled separately, e.g. by way of a time adjustment command or message periodically issued or transmitted by a network device having an accurate representation of time (such as a TTI 40 (FIG. 1) which has received caller ID information from an inbound call including date/time information accurate to precision of 1 second, as may be maintained by a PSTN switch for example).

In the present embodiment, the master network device is selected on the basis of its MAC address. Specifically, the network device having a Lowest Active MAC ("LAM") address is designated to be the master. Other techniques for designating a master may be used in alternative embodiments. For example, the device having the highest active MAC address may be chosen. Alternatively, a different network device identifier, such as a serial number of the network device, may be used as the unique identifier. The exact approach for uniquely identifying the master reference is not crucial, as long as each network device consistently selects the same network device as the master reference.

While in the Active State 1900, if the terminal set 100-1 deems itself to be inactive in a "transitive" manner, i.e. inactive but capable of automatically becoming active once again upon the occurrence of an event, the terminal set 100-1 transitions from the Active State 1900 back to the Free Run State 1800. This may for example occur when the terminal set 100-1 detects a DN conflict between itself and another terminal set. The rationale for transitioning to the Free Run State 1800 in this situation is that, because the terminal set 100-1 is no longer necessarily reliably connected to a network, no time synchronization should be performed until a reliable connection is re-established.

Figure 11:
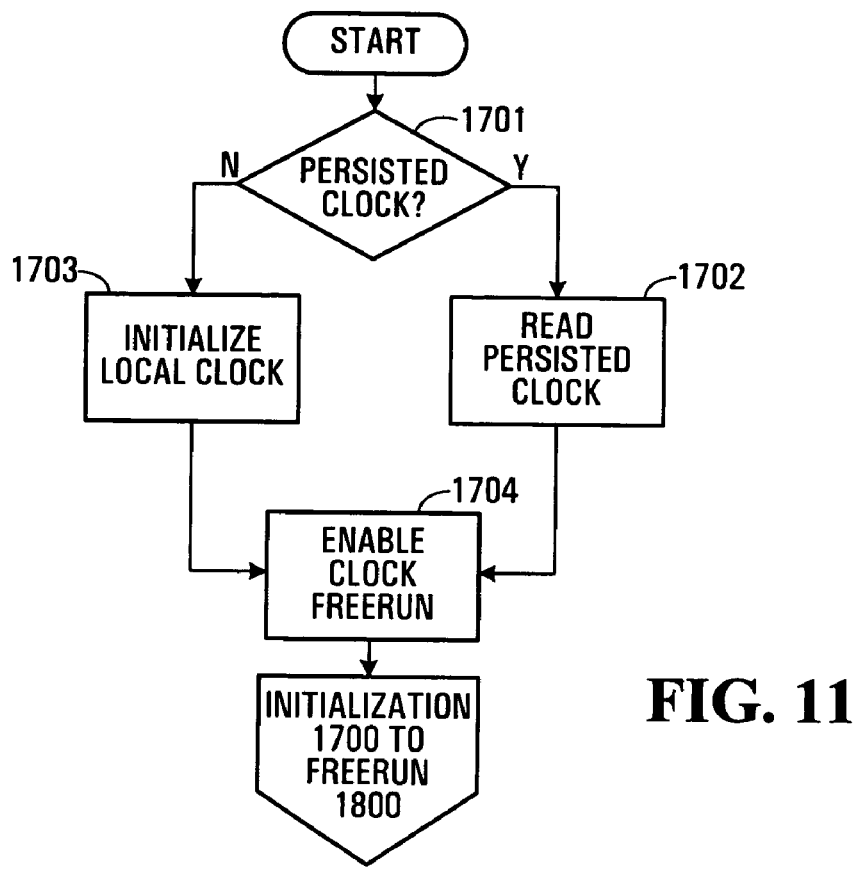
FIG. 11 illustrates operation of a terminal set in an Initialization State shown in FIG. 10.

FIG. 11 illustrates operation of the terminal set 100-1 while in the Initialization State 1700 of FIG. 10. Initially, a determination is made as to whether a value for the local clock has persisted, e.g. whether a battery has kept the local clock 988 running (1701). A battery backup may allow the local clock 988 to run even when the terminal set 100-1 loses power.

If the determination of 1701 is made in the positive, a persisted value for the local clock source is read (1702). "Reading" the local clock at 1702 may simply entail relying on the local clock's current value given that the clock has continued run even while the terminal set 100-1 may have been without power.

Alternatively, if the determination of 1701 is made in the negative, the local clock is initialized to a suitable initialization value, such as a "zero date" for example (1703). The zero date may be the same as that used by the MicroSoft™ Disk Operating System ("MSDOS"), i.e., Jan. 1, 1980, or may be a different value.

Regardless of whether the local clock has persisted or has been initialized to suitable initialization value, it is enabled to run freely (1704), and the terminal set 100-1 transitions into the Free Run State 1800 (FIG. 10).

Figure 12:
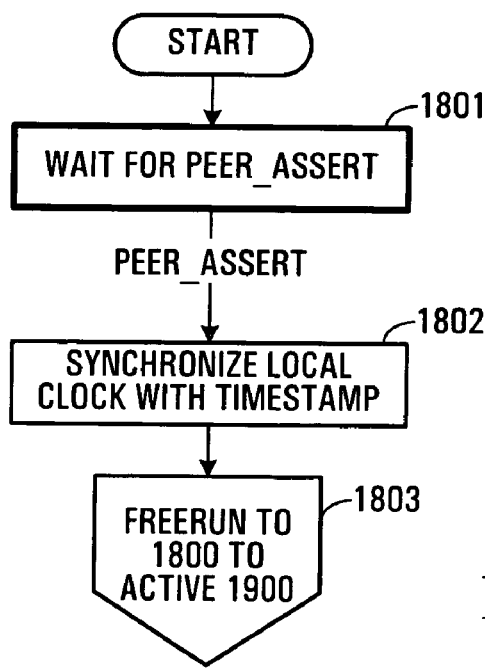
FIG. 12 illustrates operation of a terminal set in a Free Run State shown in FIG. 10.

FIG. 12 illustrates operation of the terminal set 100-1 while in the Free Run State 1800 of FIG. 10. A terminal set may enter the Free Run State 1800 in one of two ways:

1. From the Initialization State 1700 as described above; or
2. From the Active State 1900, when it is determined that the terminal set has become inactive (as will be described).

In the present embodiment, the Free Run State 1800 coincides with the DN Probe State 900 of the peer discovery state machine (FIG. 5). Thus, while the terminal set is in the process of probing a DN, it also awaits a message containing an indication of the "network time" against which time synchronization may be performed. However, it should also be appreciated that in some cases a terminal set may remain in the Free Run State 1800 even after it has advanced to the DN Assertion State 700 of the peer discovery state machine. For example, this may occur in the case where the terminal set is the first network device to be activated on a network, such that no other network device capable of sending PEER_ASSERT messages exists.

Referring to FIG. 12, initially the terminal set 100-1 waits for a PEER_ASSERT message from any other terminal set (1801). While waiting at 1801, the local clock 988 continues to run freely.

Upon receipt of a PEER_ASSERT message from any other terminal set, the network device synchronizes its local clock 988 against the timestamp from the PEER_ASSERT message (1802). The use of the PEER_ASSERT message timestamp is again based on an implicit understanding that any network device sending a PEER_ASSERT message will have already been synchronized with "network time" or will represent de facto "network time".

For clarity, if two terminal sets simultaneously enter the "wait for PEER_ASSERT message" state 1801, there is no deadlock between the terminal sets, since either terminal set may advance to the DN Assertion State 700 (of the peer discovery state machine of FIG. 5) independently of waiting in state 1801, in which case the terminal set will begin sending PEER_ASSERT messages to the other terminal set.

With the local clock 988 of terminal set 100-1 now reflecting "network time", the terminal set transitions to the Active State 1900 (1803).

Figure 13:
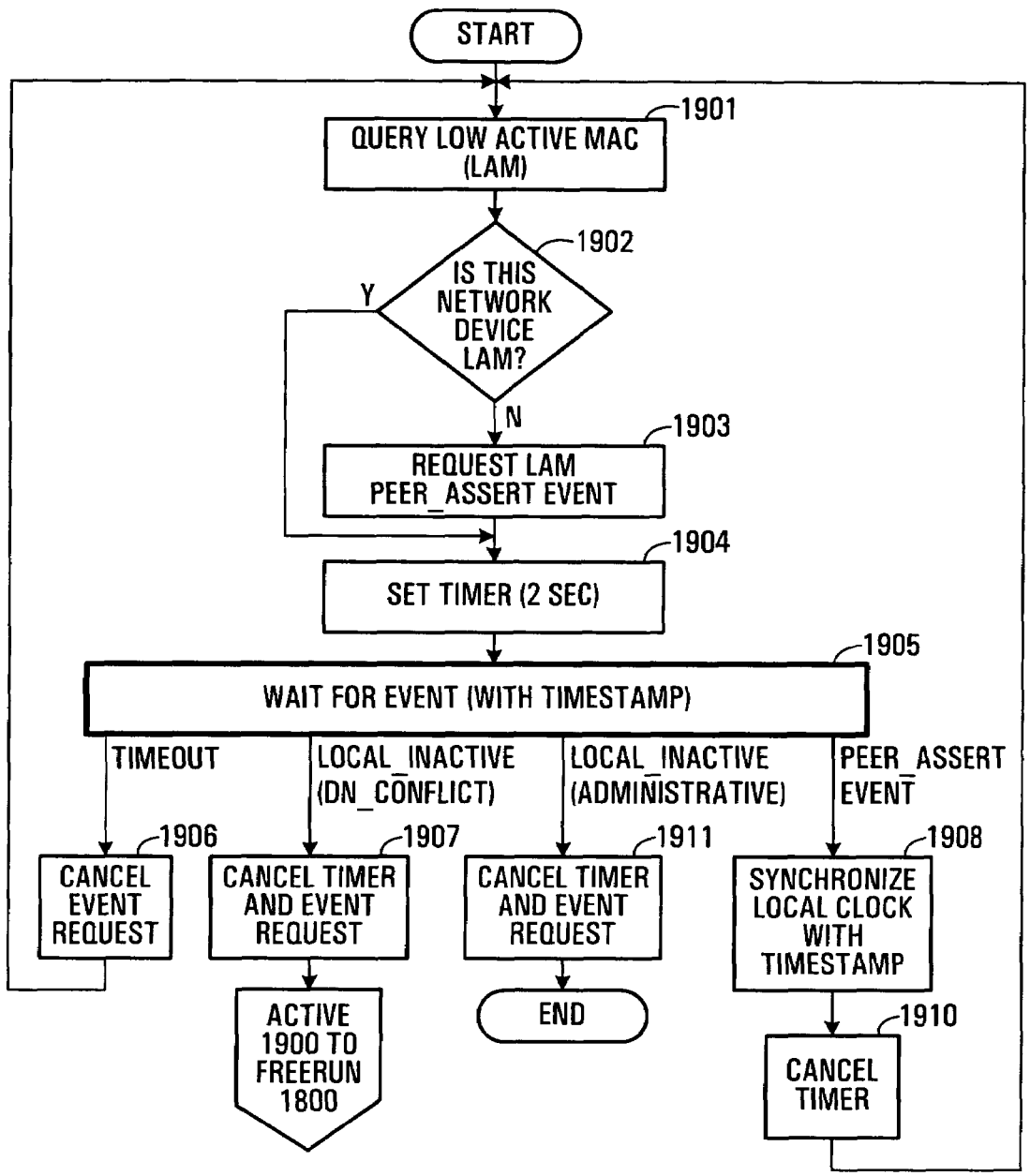
FIG. 13 illustrates operation of a terminal set in an Active State shown in FIG. 10.

FIG. 13 illustrates operation of the terminal set 100-1 while in the Active State 1900 of FIG. 10. In the Active state, the network device periodically synchronizes its local clock to timestamps contained within PEER_ASSERT messages received from a network device that is deemed to be a "master" reference for network time, which in the present embodiment is the network device having the lowest MAC address of any active network device. For clarity, it is noted that the MAC addresses of inactive network devices are not considered in the "lowest MAC address" determination.

As shown in FIG. 13, initially the terminal set 100-1 examines its routing table 200 (FIG. 4) to determine which active terminal set has the lowest MAC address (1901). If it is determined that another terminal set has the lowest MAC address of any active network device (1902), terminal set 100-1 configures the Peer Discovery module 110 (FIG. 3) to generate an event when a PEER_ASSERT message is received from that terminal set (1903). Otherwise, or following 1903, a delay timer is set to delay for, e.g., 2 seconds (1904), and the terminal set enters a "wait for event" state (1905).

At 1905, the network device waits for one of four events:

1. Expiry of the 2-second timer, which indicates that no PEER_ASSERT message has been received from a network device having the LAM for a duration of 2 seconds. In this case, the request of 1903 is cancelled (1906), and operation returns to 1901 to repeat a synchronization message cycle. The rationale for cancelling the request (at 1906) and then immediately regenerating another request (at 1903, during the next iteration) is that the timer expiry likely reflects a situation in which the terminal set 100-1 has lost its ability to receive messages from the master network device (e.g. due to a problem with the master network device or a segmentation of the network). By repeating operation at 1901 to 1903, a new lowest active MAC (LAM) network device which differs from the LAM identified during the previous iteration may be identified (since the first LAM may now be inactive).

2. A Local_Inactive event indicating that the current terminal set 100-1 will become inactive on a transitive basis (i.e. that the terminal set has become inactive but may automatically become active again upon the occurrence of some event). Such an event may be generated upon detection of a DN conflict with another terminal set for example. In this case, the terminal set 100-1 will continue to operate, even if it is considered to be inactive by other terminal sets (i.e. no longer transmitting PEER_ASSERT messages). In this case, the request to the peer discovery module 110 (made in 1903) and timer (made in 1904) are cancelled (at 1907) and the terminal set 100-1 transitions to the Free Run State 1800.

3. A Local_Inactive event indicating enduring inactivity of the current terminal set 100-1 (i.e. indicating that the terminal set has become inactive and is not likely to become active again, at least not automatically upon the occurrence of some event). This may for example occur due to administrative action, e.g. upon decommissioning of the terminal set 100-1. In this case, the request to the peer discovery module 110 (made in 1903) and timer (made in 1904) are cancelled (at 1911) and operation of the time synchronization state machine 986 ceases.

4. Receipt of a PEER_ASSERT message from the master network device (i.e. from the terminal set having the lowest MAC address of any active terminal set). In this case, the terminal set 100-1 synchronizes its clock using the timestamp from the PEER_ASSERT message (1908). Although this may result in some inconsistency between network devices resulting from network propagation delays, such inconsistency can be tolerated for many applications. If, for instance, typical delays of less than 5 milliseconds can be expected within a LAN segment, such delay may be negligible for a clock precision of 0.1 seconds or greater. However, in the case where the required precision is in the same order of magnitude as the anticipated delays, adjustment of clocks to account for the delay may be prudent (e.g. over the public internet where nominal delay can be expected to be much larger, adjustment for delay may be prudent). Those skilled in the art will be familiar with mechanisms for measuring and adjusting clocks in the presence of network propagation delays, which the implementer may chose to employ. The timer is then cancelled (1910), and operation returns to 1901 to repeat a synchronization cycle.

It is noted that, as terminal sets or other network devices are added and removed from the network 30, the device which serves as a reference for time may change, e.g. because the identity of the network device having the lowest MAC address of any active device may change. Periodic repetition of operation at 1901, 1902, 1903, and 1904 allows the terminal set 100-1 to reset its designation of a master network device should the identity of the master network device change over time.

The embodiment illustrated in FIGS. 10 to 13 has been described in the context of peer discovery in which PEER_ASSERT messages are used to obtain timestamps for synchronization; however, it will be appreciated that the invention is not limited to the use of PEER_ASSERT messages for obtaining timestamps. Any message containing a timestamp reflecting a representation of a reference time may be used.

In some embodiments of the invention, a network device designated as a reference for time proactively acts on the clocks of other network devices to synchronize them to its own clock. For example, in some embodiments of the invention a network device having a clock is designated as a reference for time by for example action by a system administrator. The network device designated as a reference for time may maintain a list, for example the routing table 200 of FIG. 4, identifying others of other network devices that are active, and periodically synchronizes clocks of the other network devices with its own clock.

In some embodiments of the invention a network device determines whether it is a reference for time using information at the network device. This information may for example be a MAC address or any other suitable unique identifier of network devices. If the network device is a reference for time, then the network device sends a timestamp to one or more other network devices for synchronization of the other network devices using the timestamp. In some embodiments of the invention, the network device consults its routing table 200 to determine which network devices should receive the timestamp. In some embodiments of the invention, the network device determines whether it is a reference for time in response to receiving a message from one of the other network devices. In other embodiments of the invention, the network device periodically determines whether it is a reference for time and, if so, sends a timestamp to the other network devices for synchronization using the timestamp.

In addition to performing time synchronization between terminal sets as described above, some embodiments of the invention may provide a method for the network time to be set or adjusted manually at any network device. This may be performed by way of a manual administrative action (e.g. a system administrator setting the time at a network device). A network device, when so manually configured, may be designed to propagate its newly adjusted local time to all other network devices, with the rationale that a manually-set time is likely to be based on an accurate knowledge of actual time that should be reflected at each network device. In some embodiments, propagation may be performed in response to receipt at the network device of some reliable external time information, for example from Caller Identification information provided from a public carrier's telephone network, or through a time distribution protocol such as NTP or SNTP from a time server. This may have the effect of periodically synchronizing network time with an accurate representation of actual time.

Turning from time synchronization to data synchronization, FIGS. 14 to 18 illustrate a method of synchronizing data between network devices (i.e. maintaining coherence between copies of data at different network devices). In the present embodiment, the method utilizes monotonically increasing counters maintained at each terminal set for data synchronization. The counters track the passage of time (e.g. are incremented every second) but do not necessarily reflect the current date or time. A counter's value is referred to as a Data Sequence Number (DSN). It will be appreciated that a DSN is not impacted by such apparent non-linear jumps in time such as daylight savings time or adjustment of local date/time; in such situations, the DSN simply continues to increase.

According to the method illustrated in FIGS. 14 to 18, steps are taken to synchronize the DSN at different network devices. When data is changed at a given terminal set, a "snapshot" of the current DSN at that network device is captured and associated with that data. When the changed data is propagated to other network devices, it is accompanied by the associated captured DSN value. Copies of that data existing at other network devices will each have an associated snapshot DSN value which represents the DSN at the moment that the copy was created or last updated. The newly-captured DSN is compared to the existing DSN to determine which version of the data should be kept, with larger DSN values generally indicating more recent and thus preferable data.

Figure 14:
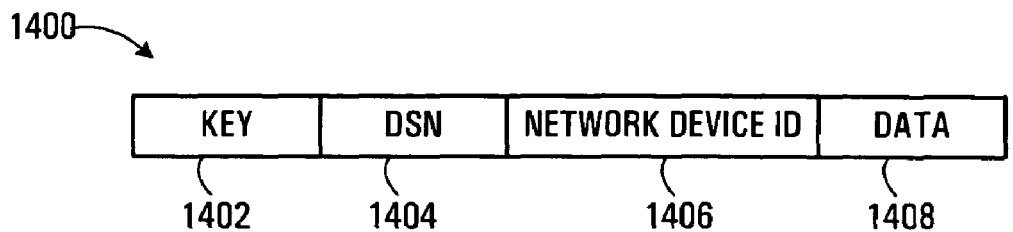
FIG. 14 illustrates an exemplary database record which may be stored in database of a terminal set.

FIG. 14 illustrates an exemplary database record 1400 which may be stored in database 996 (FIG. 9) of a terminal set. The exemplary record 1400 includes a key 1402, a captured DSN 1404, a network device ID 1406, and data 1408. Key 1402 is a uniquely resolvable reference to data 1408. The use of keys to uniquely reference data is well understood by those skilled in the art of databases. The DSN 1404 is a snapshot of a DSN counter 994 at the time the data 1408 was last changed (i.e. created or updated). DSN 1404 serves as an indicator of the relative age of the data 1408 in comparison to other copies of the data 1408 which may exist at other network devices. The network device ID 1406 is an identifier which uniquely identifies the network device which generated the data 1408. In the present embodiment, the network device ID 1406 is a MAC address; however, other forms of unique identifiers may be used in alternative embodiments. Finally, data 1408 is a data element (or more than one data element) of interest.

Figure 15:
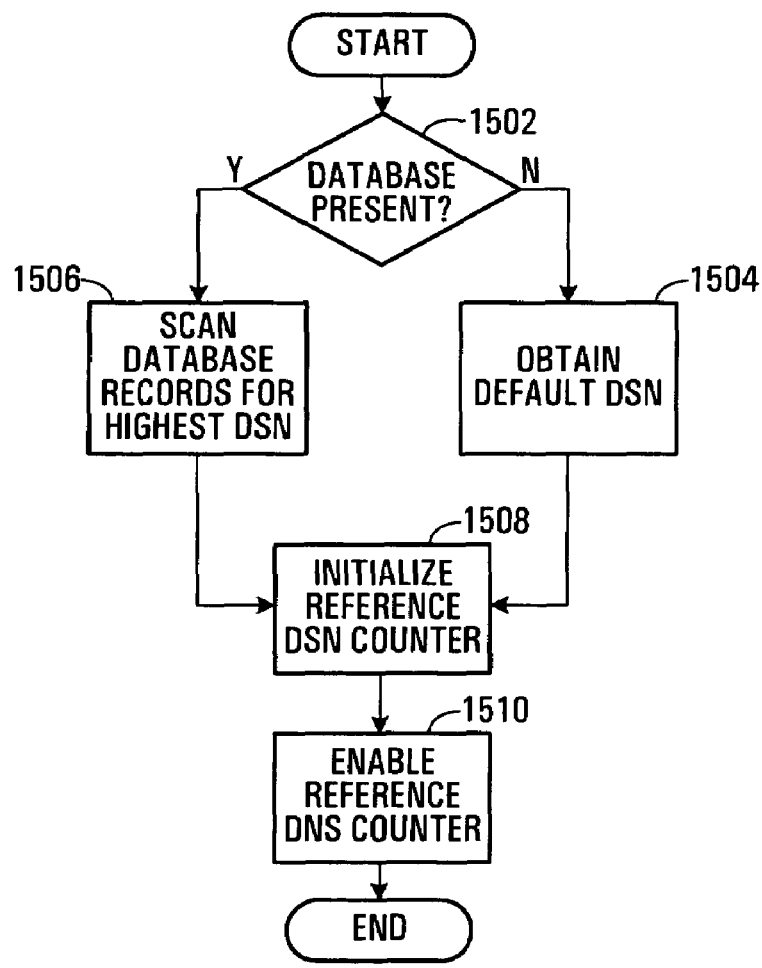
FIG. 15 illustrates initialization of a Data Sequence Number (DSN) counter used for purposes of data synchronization.

FIG. 15 illustrates initialization of the local DSN counter 994 of FIG. 9 at an exemplary terminal set 100-1. Initialization typically occurs upon start-up of the terminal set 100-1. Initially, a determination is made as to whether a local database 996 exists (1502). When a new device is started for the first time (e.g. from a "factory fresh" state), no local database 996 will exist. In this situation, a default DSN is obtained (1504). Otherwise, if a database 996 is found to exist (e.g. as may have been stored in non-volatile memory by terminal set 100-1 prior to a period of inactivity), each record 1400 (FIG. 14) of the local database 996 is scanned, and the highest DSN stored in DSN field 1404 of any record is noted (1506).

Thereafter the obtained or noted DSN value is used to initialize (e.g. is written to) the local DSN counter 994 of FIG. 9 (1508). Thereafter, the DSN counter 994 is enabled (i.e. activated) (1510) so as to be incremented at regular intervals as measured by the timer 990 (FIG. 9), as previously described.

Figure 16:
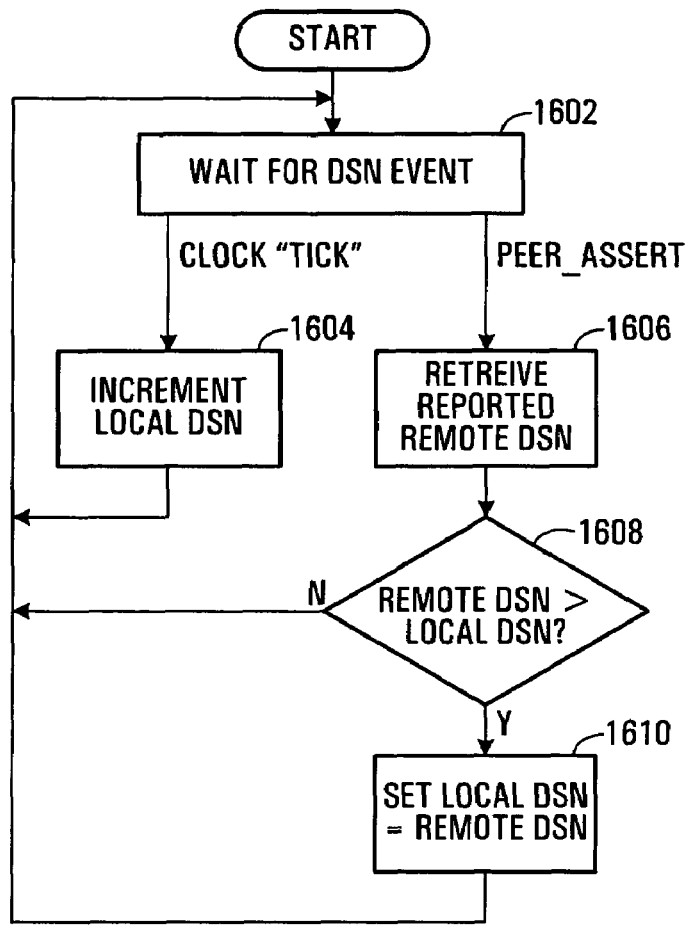
FIG. 16 illustrates operation for synchronizing DSN counters between terminal sets for purposes of data synchronization.

FIG. 16 illustrates operation of the data synchronization module 992 (FIG. 9) for adjusting the local DSN counter 994 at an exemplary terminal set 100-1 as necessary for coherence with the DSN counters 994 at other terminal sets, within an acceptable margin of error.

Initially, data synchronization module 992 waits for either of two types of "DSN events" (1602) to occur.

The first type of DSN event is the receipt of a "tick" from timer 990 (FIG. 9). Upon receipt of a "tick" from timer 990, the local DSN 912 counter is incremented (1604), and control returns to 1602 to await further events.

The second type of DSN event is the receipt of a PEER_ASSERT message from another terminal set. The PEER_ASSERT message will include the current value of the DSN counter at the remote network device which has sent the PEER_ASSERT message (or at least the value of the DSN counter at the remote network device at the time that the PEER_ASSERT message was sent). In this case, the DSN value is extracted from the message (1606) and compared to the current value of the local DSN counter 994 (1608).

If it is determined at 1608 that the value of the DSN of the remote terminal set is larger than the current value of local DSN counter 994 (i.e. represents a greater passage of time than the passage of time indicated by the local DSN counter 994), the local DSN counter 994 is advanced to match the remote DSN value, e.g., by overwriting the value of the local DSN counter 994 with the extracted remote DSN value (1610). When this is done by each terminal set, over time all of the terminal sets will become synchronized with the highest DSN maintained by any terminal set. The highest DSN is used because, if another DSN value (e.g. lowest DSN) were used for synchronization, the DSN at one or more terminal sets may decrease. Decreases in DSN values are to be avoided so that higher DSN values will consistently indicate more recent data changes. Thereafter, control returns to 1602 to await further DSN events.

If it is instead determined at 1608 that the DSN of the remote network device is less than or equal to the value of the local DSN counter 994, control simply returns to 1602 to await further DSN events.

Figure 17:
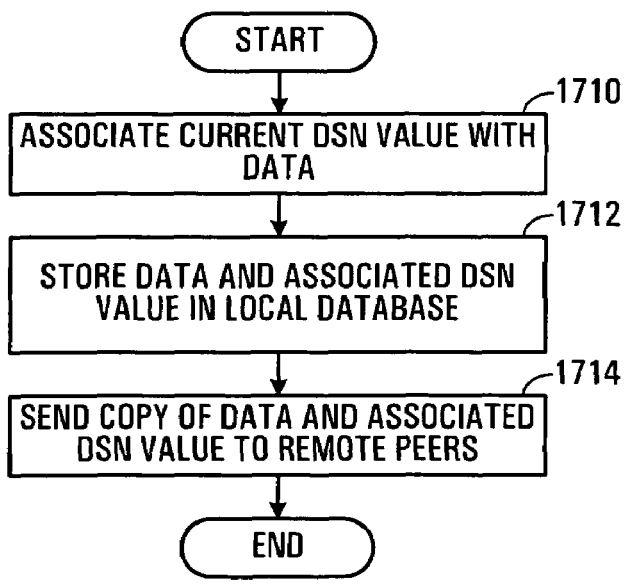
FIG. 17 illustrates operation for storing changed data at a terminal set in accordance with data synchronization operation.

FIG. 17 illustrates operation of the data synchronization module 992 (FIG. 9) for storing changed data at a terminal set upon a change to the data. Initially, a "snapshot" of the value of the local DSN counter 994 at the time of changing of the data is taken and is associated with the data (1710). Association may for example be achieved by storing the captured DSN value in a record 1400 (FIG. 14) along with the newly changed data. The data is then stored locally along with its associated snapshot DSN value, e.g. in database 996 (1712).

Thereafter, other terminal sets are notified of the changed data (1714). In the present embodiment, notification takes the form of a message including a copy of the changed data along with the captured DSN value. Depending on the nature of the data, the number of terminal sets or other network devices that may require notification of the changed data may vary. For example, in may be desirable for changes to global administrative data to be propagated to all network devices in the network 30, whereas other changes may only be propagated to a subset of network devices requiring a copy of the data. Each terminal set which receives the changed data will then engage in operation to determine whether its local copy requires updating, in a manner that will now be described in conjunction with FIG. 18.

Figure 18:
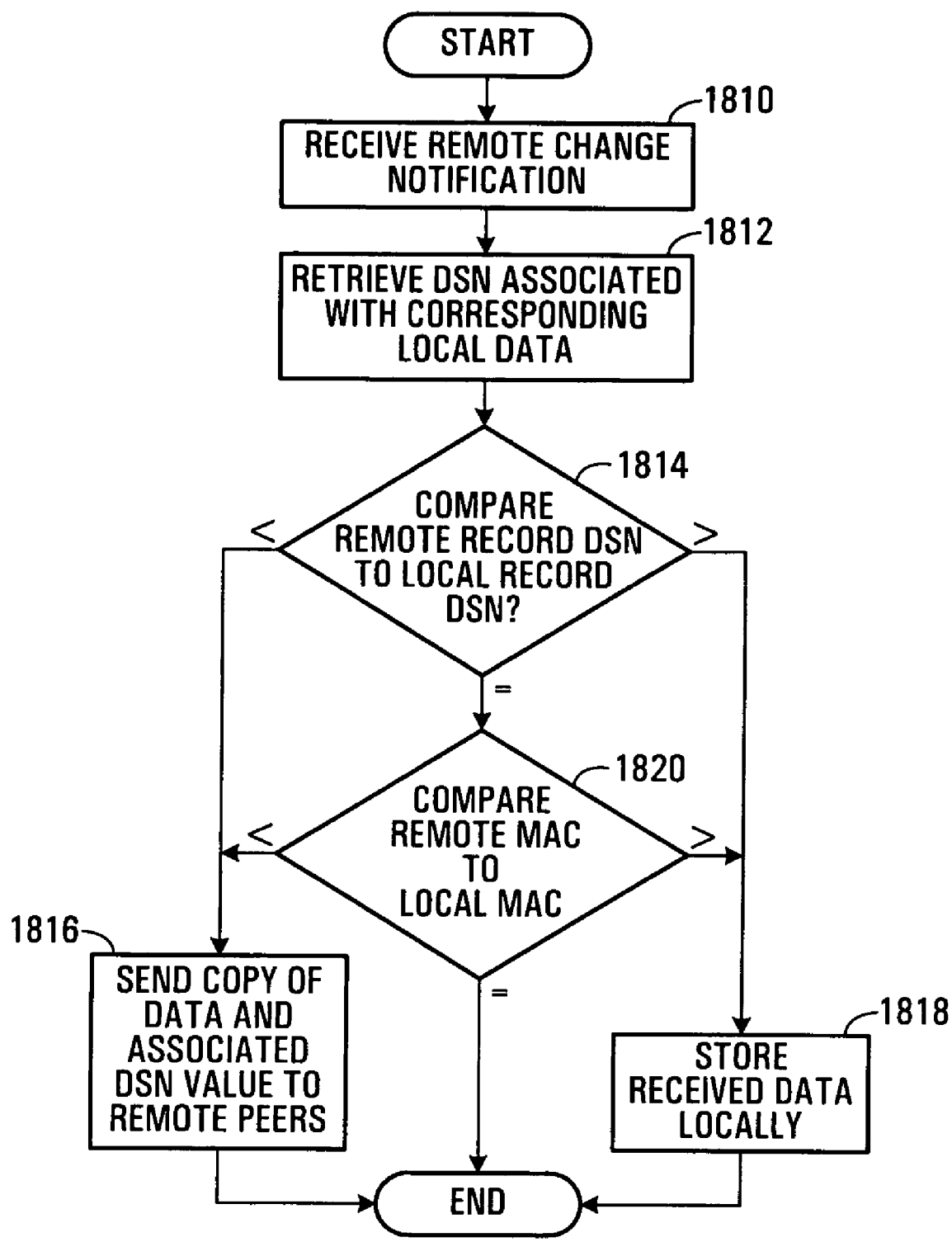
FIG. 18 illustrates operation for synchronizing data at a terminal set with a remote copy of the data at another terminal set.

FIG. 18 illustrates operation for maintaining coherence between a local copy of data and a remote copy of the data upon receipt of a notification indicating that a remote copy of the data has been changed. Initially, notification of the of the data change at a remote terminal set is received (1810). Notification takes the form of a message including a copy of the changed data along with a captured value of the DSN of the sending terminal set at the time the data was changed. Alternative embodiments may include just an indication of the changed data (e.g. a key uniquely identifying the data) rather than a copy of the changed data. Thereafter, the DSN stored in association with the local copy of the data is retrieved (1812). Retrieval may involve using a key included within the received notification to retrieve a corresponding record from a local database 996 which includes a DSN value 1404 captured at the time of creation or most recent updating of the local data 1408. The DSN value referred to as the "stored DSN value") is then compared with the DSN value received from the terminal set originating the remote change notification (1814).

If the comparison at 1814 indicates that the received DSN value is smaller than the stored DSN value, this reflects a situation in which the local data is more recent and therefore preferable over the version from the remote network device.

Accordingly, the local data is preserved. Moreover, the other terminal set (and other network devices) are notified of the data at the local network device (1816). The latter action is taken to cause any remote network devices having outdated copies of the data to update their copies; it may be performed in an analogous manner to 1714 of FIG. 17.

If the comparison at 1814 instead reveals that the received DSN value is larger than the stored DSN value, this reflects a situation in which the received copy of the data is more recent and therefore preferable over the locally stored version. Accordingly, the received data is stored locally along with the received DSN value (1818), e.g. overwriting the previously stored data and DSN value.

If the comparison at 1814 indicates that the received DSN value is equal to the stored DSN value, then a further test is applied to determine which of the received copy of the data and the stored data is preferable. In the present embodiment, this further test takes the form of a comparison between the MAC address of the remote terminal set and the MAC address of the local terminal set (1820). The terminal set having the lower MAC address is deemed to have the preferable version of the data. This is not based on any inherent superiority of the data maintained by the network device having the lower MAC address, but rather simply establishes a uniform rule which, when consistently applied at each network device in a network, should result in each network device reaching the same conclusion about whose copy of a piece of data is preferable.

In the event that the comparison of 1820 reveals the MAC addresses of the remote and local network devices to be equal, then the notification received in 1810 actually pertains to the local network device. In this case, no action is required.

As will be appreciated by those skilled in the art, modifications to the above-described embodiment can be made without departing from the essence of the invention. For example, although the described embodiment largely refers to peers that are terminal sets, it will be appreciated that the described methods are equally applicable to peers other than terminal sets, such as other forms of network devices. As well, network devices may be interconnected by any form of network, not just a LAN. Further, although the peer discovery description refers to the selection, probing and assertion of directory numbers, it will be appreciated that the described methods are equally applicable to network addresses other than directory numbers.

In respect of the described time synchronization operation, it is not necessary for a network device to utilize PEER_ASSERT messages for purposes of periodic synchronization. Any incoming communication from another network device or peer which is known to represent network time may be used.

In respect of the described data synchronization operation, it is noted that, in alternative embodiments, the counters at each network device may (all) be monotonically decreasing counters (rather than monotonically increasing counters), with each counter being decremented, e.g., every second. In this case, smaller values would represent a greater passage of time and thus more recent data. In such embodiments, counter synchronization between terminal sets would entail setting the counter with the larger value to the smaller value.

It should also be appreciated that the terms "monotonically increasing counter" and "monotonically decreasing counter" are not limited to hardware counters. Rather, any mechanism which may be used to maintain a monotonically increasing or decreasing value may be used. Moreover, it is noted that it may be a practical necessity to reset or "wrap" such counters, for instance to a zero value (for monotonically increasing counters) or a maximum value (for monotonically decreasing counters), when a maximum amount of time that is capable of being represented by the adopted counter or mechanism is reached.

Additionally, it is noted that some embodiments may not automatically include copies of changed data in outgoing change notifications (as are sent at 1714 of FIGS. 17 and 1816 of FIG. 18). Rather, an indication of which data has changed (e.g. unique database keys) could be sent without including the changed data. This approach may be adopted in cases where the changed data is particularly large, such that it would be undesirable to occupy network bandwidth by sending a copy of the changed data unless it is confirmed that the copy at a remote network device requires updating.

Finally, while the above-described methods and state machine are described as being implemented by or at each network device, it will be appreciated that they could be implemented externally to the network device but nevertheless still be associated with said network device (e.g. at a peripheral device). In this case, the methods and state machine would still be considered to be performed by or at the network device.

Numerous further modifications and variations of the present invention are possible in light of the above teachings. It is therefore to be understood that within the scope of the appended claims, the invention may be practiced otherwise than as specifically described herein.

What is claimed is:

1. In a real time communications network, having a plurality of communication devices, which are connected together in a peer-to-peer relationship, a synchronization method, comprising;
   building a table of information about the communication devices;
   selecting one of the peer communication devices included in the table as a reference communications device, and all the communications devices utilizing a same technique for selecting the reference communications device;
   tracking the passage of time at the communications devices by advancing incrementally a local counter at each of the communications devices;
   storing data at one or more of the communications devices;
   associating a copy of the data at each communications device with the output of the local counter at the each communications device;
   comparing the output of the local counter with an output of a remote counter of a remote communications device when a predetermined event occurs; and
   notifying the each communications device, when the output of the counter of the remote device indicates that a more recent copy of the data resides at the remote communications device.

2. The method according to claim 1 which further includes;
   designating the time at the reference communications device to be network time;
   advancing incrementally a local clock at the communication devices; and
   synchronizing periodically the clocks disposed at the non-selected peer communications devices with the network time at the reference communications device, when the predetermined event occurs.

3. The method according to claim 2 wherein when the copy of the data is changed the current output of the local counter is associated with the changed copy of the data.

4. The method according to claim 2 wherein the selection of the reference communications device is a function of the hardware address.

5. The method according to claim 4 wherein the reference communications device is the one with the lowest hardware address.

6. The method according to claim 4 wherein the reference communications device is the one with the highest hardware address.

7. The method according to claim 2 wherein the communications devices are telephones which are identified by extension numbers.

8. The method according to claim 2 wherein the network time is periodically synchronized to the actual time.

9. The method according to claim 1 wherein if the comparison of the local counter to remote counter indicates that the most recent data is stored on the each communications device, the local copy is preserved at the each communications device and the remote communications devices are notified.

10. The method according to claim 1 wherein if the comparison of the local counter to remote counter indicates that the most recent data is stored on the remote communications device, the remote copy is retrieved from the remote communications device for storage on the each communications device.

11. The method of claim 1 wherein if the comparing indicates that the value of the remote counter is equal to the stored value of the local counter, applying a further test to determine which of the stored data and the remote copy of said data is preferable.

12. The method of claim 11 wherein the applying of a further test includes comparing a unique identifier of the local communications device to a unique identifier of the remote communications device.

13. The method of claim 12 wherein the unique identifiers are hardware addresses.

14. The method of claim 13 wherein, if the comparing indicates that the hardware address of the each communications device is larger than the hardware address of the remote communications device, a determination is made that the remote copy of the data is preferable to the locally stored data.

15. The method of claim 14 further including, if the comparing indicates that the hardware address of the each communications device is larger than the hardware address of the remote communications device, replacing the locally stored data with the remote copy.

16. The method of claim 15 wherein, if the comparing indicates that the hardware address of the each communications device is smaller than the hardware address of the remote communications device, a determination is made that the locally stored data is preferable to the remote copy of the data.

17. The method of claim 16 further comprising, if the comparing indicates that the hardware address of the each communications device is smaller than the hardware address of the remote communications device, a copy of the locally stored data is sent to the remote communications device.

18. The method according to claim 1 wherein the predetermined event includes a message from another communications device.

19. The method according to claim 18 wherein the message from another communications device includes a timestamp.

20. The method of claim 1 wherein the table of information includes extension numbers, MAC addresses and IP addresses of the communication devices.

21. The method of claim 20 wherein the table of information further includes type information of the each communications device and whether the each communication is active.

22. A real time communications network, comprising;
a plurality of communication devices, which are connected together in a peer-to-peer relationship;
a local counter disposed at each of the communications devices which track the passage of time at the communications devices, when the local counters are incrementally advanced;
storage devices for storing data at one or more of the communications devices; and
a table of information about the communication devices;
wherein one of the peer communication devices included in the table is selected as a reference communications device, and all the communications devices utilize a same technique for selecting the reference communications device;
wherein a copy of the data at each communications device is associated with the output of the local counter at the local each communications device;
wherein the output of the local counter is compared with an output of a remote counter of a remote communications device when a predetermined event occurs; and
wherein the each communications device is notified, when the output of the counter of the remote device indicates that a more recent copy of the data resides at the remote communications device.

23. The network according to claim 22
wherein the communications devices include a local clock that is advanced incrementally;
wherein the time at the reference communications device is designated to be network time; and
wherein the clocks disposed at the non-selected peer communications devices are periodically synchronized with the network time at the reference communications device, when the predetermined event occurs.

24. The network according to claim 23 wherein when the copy of the data is changed the current output of the local counter is associated with the changed copy of the data.

25. The network according to claim 23 wherein the network time is periodically synchronized to the actual time.

26. The communications terminal of claim 25 wherein if the comparing indicates that the value of the remote counter is equal to the stored value of the local counter, applying a further test to determine which of the stored data and the remote copy of said data is preferable.

27. The communications terminal of claim 26 wherein the applying of a further test includes comparing a unique identifier of the local communications terminal to a unique identifier of the remote communications terminal.

28. The communications terminal of claim 27 wherein the unique identifiers are hardware addresses.

29. The communications terminal of claim 28 wherein, if the comparing indicates that the hardware address of the local communications terminal is larger than the hardware address of the remote communications terminal, a determination is made that the remote copy of the data is preferable to the locally stored data.

30. The communications terminal of claim 29 further including, if the comparing indicates that the hardware address of the local communications terminal is larger than the hardware address of the remote communications terminal, replacing the locally stored data with the remote copy.

31. The communications terminal of claim 30 wherein, if the comparing indicates that the hardware address of the local communications terminal is smaller than the hardware address of the remote communications terminal, a determination is made that the locally stored data is preferable to the remote copy of the data.

32. The communications terminal of claim 31 further comprising, if the comparing indicates that the hardware address of the local communications terminal is smaller than the hardware address of the remote communications terminal, a copy of the locally stored data is sent to the remote communications terminal.

33. The network according to claim 22 wherein if the comparison of the local counter to remote counter indicates that the most recent data is stored on the each communications device, the local copy is preserved at the each communications device and the remote communications devices are notified.

34. The network according to claim 33 wherein the selection of the reference communications device is a function of the hardware address.

35. The network according to claim 34 wherein the reference communications device is the one with the lowest hardware address.

36. The network according to claim 34 wherein the reference communications device is the one with the highest hardware address.

37. The network according to claim 33 wherein the predetermined event includes a message from another communications device.

38. The network according to claim 37 wherein the message from another communications device includes a timestamp.

39. The network according to claim 38 wherein the communications devices are telephones which are identified by extension numbers.

40. The network according to claim 22 wherein if the comparison of the local counter to remote counter indicates that the most recent data is stored on the remote communications device, the remote copy is retrieved from the remote communications device for storage on the each communications device.

41. The network of claim 22 wherein if the comparing indicates that the value of the remote counter is equal to the stored value of the local counter, applying a further test to determine which of the stored data and the remote copy of said data is preferable.

42. The network of claim 41 wherein the applying of a further test includes comparing a unique identifier of the each communications device to a unique identifier of the remote communications device.

43. The network of claim 42 wherein the unique identifiers are hardware addresses.

44. The network of claim 43 wherein, if the comparing indicates that the hardware address of the each communications device is larger than the hardware address of the remote communications device, a determination is made that the remote copy of the data is preferable to the locally stored data.

45. The network of claim 44 further including, if the comparing indicates that the hardware address of the each communications device is larger than the hardware address of the remote communications device, replacing the locally stored data with the remote copy.

46. The network of claim 45 wherein, if the comparing indicates that the hardware address of the each communications device is smaller than the hardware address of the remote communications device, a determination is made that the locally stored data is preferable to the remote copy of the data.

47. The network of claim 46 further comprising, if the comparing indicates that the hardware address of the each communications device is smaller than the hardware address of the remote communications device, a copy of the locally stored data is sent to the remote communications device.

48. The network of claim 22 wherein the table of information includes extension numbers, MAC addresses and IP addresses of the communication devices.

49. The network of claim 48 wherein the table of information further includes type information of the communications devices and whether the communication devices are active.

50. A communications terminal for use in a real time communications network, comprising;
   a central processing unit;
   a data input device for inputting data to the central processing unit;
   a data output device for outputting data from the central processing unit;
   a peer discovery module for connecting the communications terminal to remote communications terminals;
   a storage device that stores data including a table of information about the communications terminal and remote communications terminals connected to the communication terminal in a peer-to-peer relationship; and
   a time and synchronization module that includes a local counter which is incrementally advanced and which tracks the passage of time at the communications terminal;
   wherein one of the peer communication terminals included in the table is selected as a reference communications terminal, and all the communications terminals utilize a same technique for selecting the reference communications terminal;
   wherein a copy of the data at each communications terminal is associated with the output of the counter at the communications terminal;
   wherein the output of the local counter of the communications terminal is compared with an output of a remote counter of a remote communications terminal when a predetermined event occurs; and
   wherein the communications terminal is notified, when the output of the counter of the remote communications terminal indicates that a more recent copy of data resides at the remote communications terminal.

51. The communications terminal according to claim 50, wherein the communications terminal includes a local clock that is advanced incrementally;
   wherein the time at the reference communications terminal is designated to be network time; and
   wherein the local clock is periodically synchronized with the network time at the reference communications terminal, when the predetermined event occurs.

52. The communications terminal according to claim 51 wherein when the copy of the data is changed the current output of the local counter is associated with the changed copy of the data.

53. The communications terminal according to claim 51 wherein the communications terminal is a telephone which is identified by an extension number.

54. The communications terminal according to claim 51 wherein the network time is periodically synchronized to the actual time.

55. The communications terminal according to claim 50 wherein if the comparison of the local counter to remote counter indicates that the most recent data is stored on the local communications terminal, the local copy is preserved at the local communications terminal and the remote communications terminals are notified.

56. The communications terminal according to claim 50 wherein if the comparison of the local counter to remote counter indicates that the most recent data is stored on the remote communications terminal, the remote copy is retrieved from the remote communications terminal for storage at the local communications terminal.

57. The communications terminal according to claim 50 wherein the selection of the reference communications terminal is a function of the hardware address.

58. The communications terminal according to claim 57 wherein the reference communications terminal is the one with the lowest hardware address.

59. The communications terminal according to claim 57 wherein the reference communications terminal is the one with the highest hardware address.

60. The communications terminal according to claim 50 wherein the predetermined event includes a message from another communications terminal.

61. The communications terminal according to claim 60 wherein the message from another communications terminal includes a timestamp.

62. The communications terminal of claim 50 wherein the table of information includes extension numbers, MAC addresses and IP addresses of the communications terminals.

63. The communications terminal of claim 62 wherein the table of information further includes type information of the communications terminal and whether the communications terminal is active.

* * * * *